United States Patent [19]
Nakatani et al.

[11] Patent Number: 6,031,966
[45] Date of Patent: Feb. 29, 2000

[54] MOTOR SPEED CONTROL DEVICE

[75] Inventors: Masaji Nakatani, Nara; Chiaki Yamawaki, Habikino; Mitsunobu Yoshida, Tenri, all of Japan

[73] Assignee: Sharp Kabushiki Kaisha, Osaka, Japan

[21] Appl. No.: 08/984,165

[22] Filed: Dec. 3, 1997

[30] Foreign Application Priority Data

Dec. 3, 1996 [JP] Japan ................................. 8-323173

[51] Int. Cl.[7] ...................................................... H02P 5/06
[52] U.S. Cl. ........................... 388/805; 388/812; 388/813; 388/814; 388/820; 360/70
[58] Field of Search ............................. 360/70; 388/812, 388/805, 813, 814, 820

[56] References Cited

U.S. PATENT DOCUMENTS

| 4,367,722 | 1/1983 | Mizuno ................................... 388/812 |
| 5,617,266 | 4/1997 | Kaniwa et al. .......................... 388/812 |

FOREIGN PATENT DOCUMENTS

| 4229539A1 | 3/1994 | Germany . |
| 4-355687A | 12/1992 | Japan . |
| 5-268786A | 10/1993 | Japan . |
| 5-76271 | 10/1993 | Japan . |
| 2256946A | 12/1992 | United Kingdom . |

*Primary Examiner*—Karen Masih

[57] ABSTRACT

The motor speed control device of the present invention is provided with an FG sensor and a waveform shaping circuit for obtaining N pulse signals ($N \geq 1$ where N is an integer) in one rotation of a motor so as to control the rotation speed of the motor in accordance with period information of the FG pulse signal outputted from the waveform shaping circuit. The motor speed control device is further provided with an FG nonuniformity correcting circuit for correcting, by using respective period information of a rising edge-falling edge period and a falling edge-rising edge period, periodic nonuniformity of each period. The motor speed control device controls the motor in response to an actual speed error signal whose nonuniformity such as a duty error and a phase error has been corrected by the FG nonuniformity correcting circuit. The described arrangement permits to provide a motor speed control device having a wide control band and a large servo gain capable of accurately controlling the rotation speed of the motor.

22 Claims, 19 Drawing Sheets

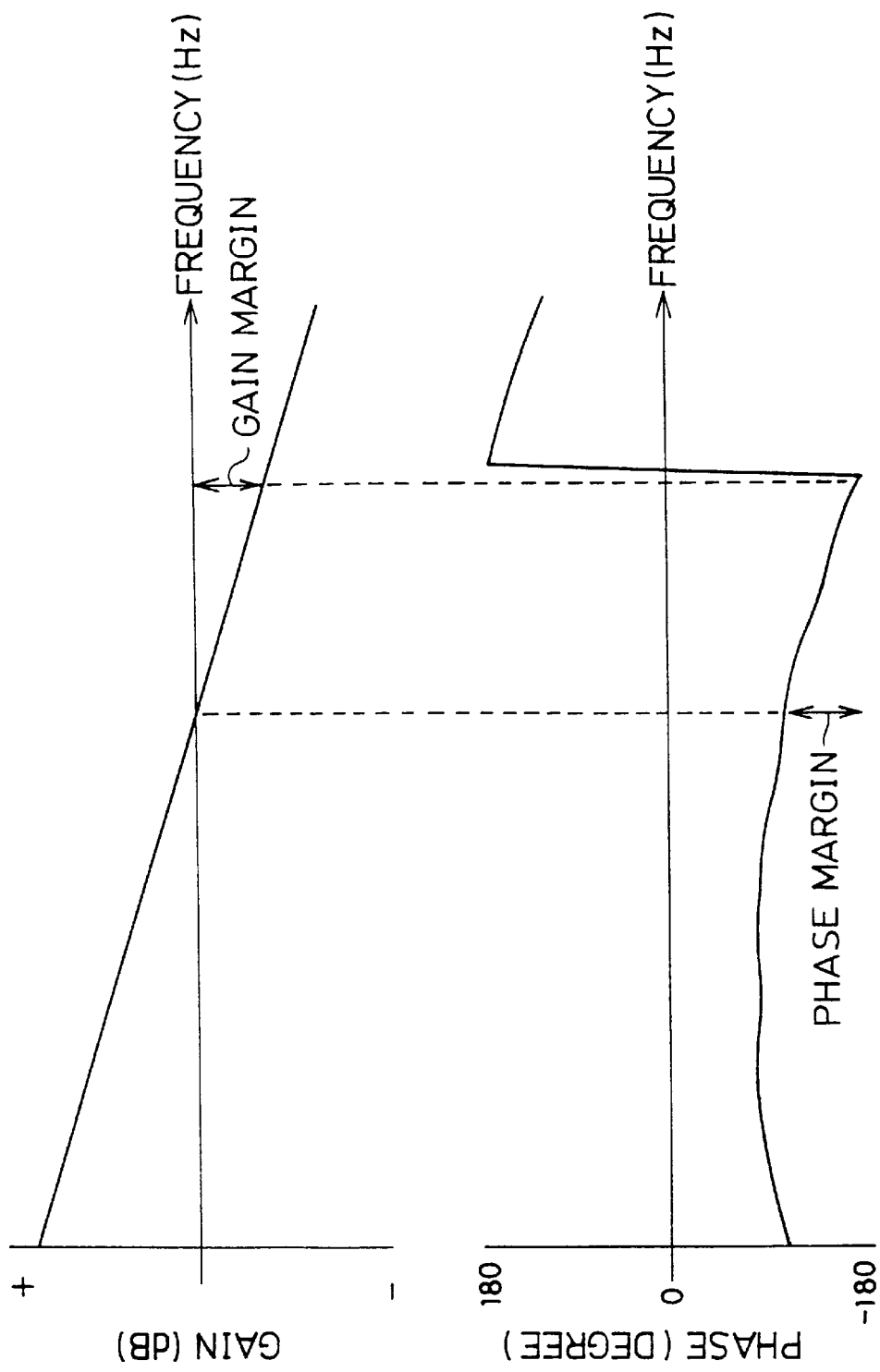

MOTOR SPEED CONTROL DEVICE

FIELD OF THE INVENTION

The present invention relates to a motor speed control device for controlling a rotation speed of a motor constant based on rotation information of a motor, and more particularly to a motor speed control device which accurately controls a capstan motor or a drum motor of a magnetic recording-reproducing device such as a VCR (Video Cassette Recorder).

BACKGROUND OF THE INVENTION

As shown in FIG. 18, a conventional motor speed control device for controlling a motor speed of a capstan motor or a drum motor of a magnetic recording-reproducing device such as a VCR is provided with, for example, a rotation detecting sensor (referred to as FG (Frequency Generator) sensor hereinafter) 52, such as an MR (Magnetic Resistance) sensor, for detecting an magnetic pattern magnetized on a rotating section of a motor 51, a waveform shaping circuit 53 for amplifying an output signal of the FG sensor 52 so as to output an FG pulse signal proportional to the motor rotation, a period calculating unit 54 for outputting period information of the FG pulse signal, an adder 55, an amplifier 56 for amplifying and phase compensating an error signal outputted from the adder 55 so as to output a speed commanding value, and a motor driving circuit 57 for driving the motor 51 according to the speed commanding value.

In this motor speed control device, period information (rotation information of the motor 51) is compared with a target value, and the difference between the period information and the target value is applied to the motor 51 so as to feedback-control the rotation speed of the motor 51 in such a manner that the period information approaches the target value. Here, in order to control the motor 51 more accurately, the amplification degree, or a servo gain is increased by changing the phase compensation value of the amplifier 56.

However, in the feedback-control of the conventional motor speed control device, because the servo gain of the amplifier 56 cannot be increased to infinity, there is a limit in controlling the motor speed with high accuracy.

Namely, as parameters for judging whether the control system is stable, for example, as shown in the Bode diagram of FIG. 19, a phase margin and a gain margin are available. The phase margin is a phase difference between the phase when the gain characteristic is 0 dB and the phase of −180°, and the gain margin is a gain when the phase characteristic is −180°.

Generally, a phase margin of 40°, and a gain margin in a range of −10 dB to −20 dB are preferable. When the phase margin and the gain margin decrease, a stable control cannot be achieved.

In the Bode diagram, when the servo gain is increased, the gain characteristic is shifted in an upward direction so that the phase margin and the gain margin decrease. Thus, the servo gain is determined by the phase characteristic. For this reason, in order to maintain a stable control system even when the servo gain is increased, a phase delay is shifted to the side of the high frequency band. Namely, the control band is widened.

The factors determining the control band are ① the detecting period of the motor speed (period of the FG pulse signal), ② phase compensation by the amplifier 56, ③ data transfer time and calculation time of A/D and D/A conversions etc. in the case where a series of processes are to be carried out by a computer software.

As for the factor ③, the phase delay can be suppressed to some degree with the aid of a high speed microcomputer or high speed IC. As for the factor ②, the phase delay can be suppressed to some degree if the phase compensation is optimally set by a designer considering the calculation time and the gain characteristic of a phase compensator.

As for the factor ①, the phase delay can be decreased when the detecting period of the motor speed is made shorter. This can be achieved by increasing the number of output pulse counts of the FG sensor 52 in one rotation of the motor. However, there is a limit to this due to the positional relationship between the magnetization pitch and the FG sensor 52.

Namely, in order to read an S/N pattern on a narrow magnetization pitch, it is required that the FG sensor is in a vicinity of a magnetization surface. However, there is a limit to this due to the oscillation accuracy etc. of the magnetization surface.

Further, due to the recent miniaturization of the motor speed control device as well as the motor 51, it is difficult to increase the number of magnetization, e.g., the number of magnetic poles, and when the motor is rotating at a low speed, the FG pulse signal period becomes even longer.

As a countermeasure, as a method for shortening the FG pulse signal period, the following methods are available. As shown in FIG. 2, a method for obtaining a detecting period twice the number of the pulse period by using a rising edge-falling edge period t(0) and a falling edge-rising edge period t(1) of the FG pulse signal, and as shown in FIG. 9, a method for obtaining a detecting period (2×m) times the number of the pulse period by using respective periods t(0), . . . , t(2×m −1) between each edge wherein FG sensors are provided in m quantities (m≧2 where m is an integer) so as to be out of phase with each other.

However, in the described methods in which two types of periods are obtained, it is difficult to obtain accurate period information due to a duty error in which a difference is generated in each period by a threshold level deviation etc. of the waveform shaping circuit 53, and a phase error generated by a mounting phase deviation of the FG sensor 52. Also, when the motor 51 is to be controlled by such information having periodic nonuniformity, problems such as a motor speed fluctuation destabilizing the motor speed and a motor noise are presented.

SUMMARY OF THE INVENTION

The present invention offers a solution to the above mentioned problems, and accordingly it is an object of the present invention to provide a motor speed control device having a wide control band and a large servo gain which accurately controls a rotation speed of a motor by an actual speed error signal in which periodic nonuniformity such as a duty error and a phase error has been corrected.

In order to achieve the above-mentioned object, the motor speed control device of the present invention is characterized by including a rotation speed detecting circuit for obtaining N (N≧1 where N is an integer) FG pulse signals in one rotation of a motor, and a first controlling circuit for controlling a rotation speed of the motor according to respective period information of (1) a rising edge-falling edge period and (2) a falling edge-rising edge period of the FG pulse signal, wherein the first controlling circuit includes a first FG nonuniformity correcting circuit for correcting, in accordance with the respective period information of the rising edge-falling edge period and the falling edge-rising edge period of the FG pulse signal, periodic nonuniformity of the each period.

With this arrangement, the rotation speed of the motor is controlled, in one rotation of the motor, by the rising edge-falling edge period and the falling edge-rising edge period of N FG pulse signals. Namely, each of 2×N period information is used to control the rotation speed of the motor.

The first FG nonuniformity correcting circuit detects the respective periodic nonuniformity of the rising edge-falling edge period and the falling edge-rising edge period so as to obtain a difference from a target value in which the nonuniformity has been corrected, namely, an actual error signal is obtained. The actual error signal thus obtained is used to accurately control the rotation speed of the motor.

Thus, even when the motor is rotating at a low speed or the FG pulse counts per rotation of the motor is low, it is possible to (1) widen a control band of the control system and (2) realize a stable and highly accurate motor rotation by the nonuniformity correction. Also, it is possible have a large servo gain so that the rotation speed of the motor can be controlled with high accuracy.

Note that, the FG pulse signal is a pulse signal having a pulse period proportional to the rotation period of the motor. For example, the FG pulse signal is obtained by shaping, in a waveform shaping circuit, a pulse waveform obtained by the detection, by an MR sensor, of magnetic resistance magnetized in a predetermined pitch on a rotating section of the motor.

In order to achieve the above-mentioned object, the motor speed control device of the present invention is characterized by including a rotation speed detecting circuit, provided in m quantities (m≧2 where m is an integer), for obtaining N FG pulse signal(s) (N≧1 where N is an integer) in one rotation of a motor, a second controlling circuit for controlling a rotation speed of the motor according to respective period information of (1) a rising edge-falling edge period and (2) a falling edge-rising edge period of m FG pulse signals, wherein the second controlling circuit includes a second FG nonuniformity correcting circuit for correcting, in accordance with period information between adjacent edges of the rising edge and/or the falling edge of each the FG pulse signal, periodic nonuniformity of each period between the edges.

With this arrangement, the rotation speed of the motor is controlled, in one rotation of the motor, by the respective period information between adjacent edges of the rising edge and/or the falling edge of N×m FG pulse signals. Namely, each of 2×N×m period information is used to control the rotation speed of the motor.

The second FG nonuniformity correcting circuit detects the respective periodic nonuniformity of the rising edge-falling edge period and the falling edge-rising edge period so as to obtain a difference from a target value in which the periodic nonuniformity has been corrected, namely, an actual error signal is obtained. The actual error signal thus obtained is used to accurately control the rotation speed of the motor.

Thus, even when the motor is rotating at a low speed or the FG pulse counts per rotation of the motor is low, it is possible to (1) widen a control band of the control system by providing a plurality of the rotation speed detecting circuits and (2) realize a stable and highly accurate motor rotation by the periodic nonuniformity correction. Also, it is possible have a large servo gain so that the rotation speed of the motor can be controlled with high accuracy.

In the motor speed control device having the described arrangements, it is preferable that the first and second FG nonuniformity correcting circuits respectively calculate the respective period ratio information of the rising edge-falling edge period and the falling edge-rising edge period so as to normalize each period information by a correction value in accordance with the period ratio information thus calculated.

As described, by normalizing each period information by the correction value in accordance with the period ratio information, it is possible to remove a gain difference generated by the periodic nonuniformity. This makes it possible to obtain the actual error signal in which it is ensured that only the periodic nonuniformity information of each period information is removed. As a result, a stable and highly accurate motor rotation is realized by the correction of the periodic nonuniformity.

In the motor speed control device having the described arrangements, it is possible, alternatively, that the first and second FG nonuniformity correcting circuits respectively calculate the respective period ratio information of the rising edge-falling edge period and the falling edge-rising edge period so as to correct the target value by the correction value in accordance with the period ratio information thus calculated.

With this arrangement, it is possible to obtain accurate period ratio information which is not dependant on the rotation speed of the motor. This makes it possible to obtain the actual error signal in which it is ensured that only the periodic nonuniformity information of each period information is removed. As a result, a stable and highly accurate motor rotation is realized by the correction of the periodic nonuniformity.

It is preferable that the first and second FG nonuniformity correcting circuits respectively calculate period ratio information from an average of respective period information of the rising edge-falling edge period and the falling edge-rising edge period of y pulse periods (y≧2 where y is an integer) or during i rotations of a motor (i≧1 where i is an integer).

As described, by integrating the period ratio information for y times or during i rotations of the motor, it is possible to average and remove a period ratio deviation due to a sudden speed fluctuation. This makes it possible to detect accurate period ratio information having only the periodic nonuniformity which should be detected.

In the motor speed control device having the described arrangements, it is preferable that the first and second FG nonuniformity correcting circuits respectively calculate one after another periodic nonuniformity even after a FG nonuniformity correction is carried out so as to compare a correction value of periodic nonuniformity thus calculated with a set value, and in the case where a difference between the correction value and the set value exceeds a set error, the first and second FG nonuniformity correcting circuits respectively carry out FG nonuniformity correction by a new correction value different from a correction value used for preceding FG nonuniformity correction.

Alternatively, it is preferable that the first and second FG nonuniformity correcting circuits respectively detect one after another an amplitude value of an error signal which is a difference between a control target and period information, and in the case where the detected value exceeds an allowed value, the first and second FG nonuniformity correcting circuits respectively carry out FG nonuniformity correction by a new correction value different from a correction value used for preceding FG nonuniformity correction.

Namely, it is preferable that the first and second FG nonuniformity correcting circuits respectively set the correction value again when (1) the result of the comparison between the correction value of the nonuniformity calculated one after another and the set value exceeds a set error or (2) the detected value of the amplitude value of the error signal which is a difference between a control target and period information exceeds an allowed value.

With this arrangement, for example, in the case where the periodic nonuniformity is changed with time such as a change in the period information due to a change in temperature etc. while the motor is running, it is ensured that the periodic nonuniformity is removed.

For a fuller understanding of the nature and advantages of the invention, reference should be made to the ensuing detailed description taken in conjunction with the accompanying drawings.

BRIEF DESCRIPTION OF THE DRAWINGS

FIG. 19 is an explanatory view showing a relationship between gain and phase of the motor speed control device.

DESCRIPTION OF THE EMBODIMENTS

The following will describe one embodiment of the present invention referring to FIG. 1 through FIG. 6.

Figure 1:
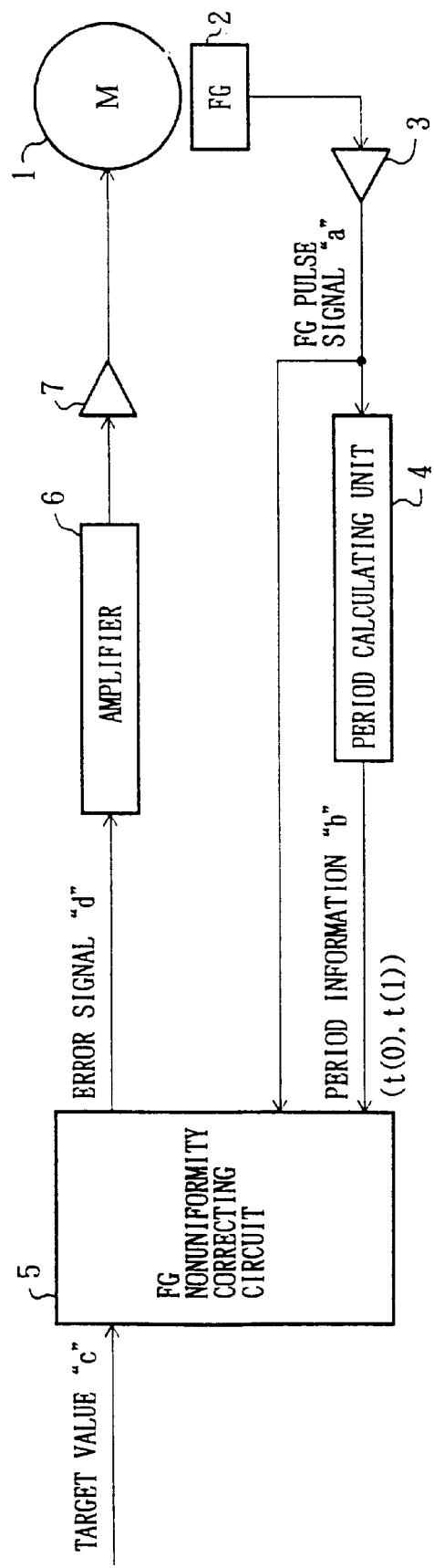
FIG. 1 is a block diagram showing one embodiment of a motor speed control device of the present invention.

A motor speed control device of the present embodiment has an arrangement wherein, as shown in FIG. 1, there are provided (1) a motor 1, (2) an FG sensor 2 such as an MR (Magnetic Resistance) sensor for detecting an S/N pattern magnetized on a motor rotating section, (3) a waveform shaping circuit 3 for amplifying an output signal of the FG sensor 2 so as to output an FG pulse signal "a" proportional to a motor speed, (4) a period calculating unit (first period calculating circuit) 4 for outputting period information "b" of the FG pulse signal "a", (5) an FG nonuniformity correcting circuit (first FG nonuniformity correcting circuit) 5 for detecting a periodic nonuniformity of the period information "b", and upon correcting the periodic nonuniformity, sending, as an actual error signal "d", a difference between the period information "b" (periods t(0) and t(1)) which has been corrected and a target value "c", (6) an amplifier 6 for carrying out a phase compensation process with respect to the error signal "d", and setting and amplifying a servo gain so as to output a speed commanding value, and (7) a motor driving circuit 7 for driving the motor 1 in accordance with the speed commanding value.

The FG sensor 2 and the waveform shaping circuit 3 respectively have a function as rotation speed detecting circuit. Also, the FG nonuniformity correcting circuit 5 and the amplifier 6 respectively have a function as first controlling circuit.

The following describes a main operation of the motor speed control device having the above arrangement.

Figure 2:
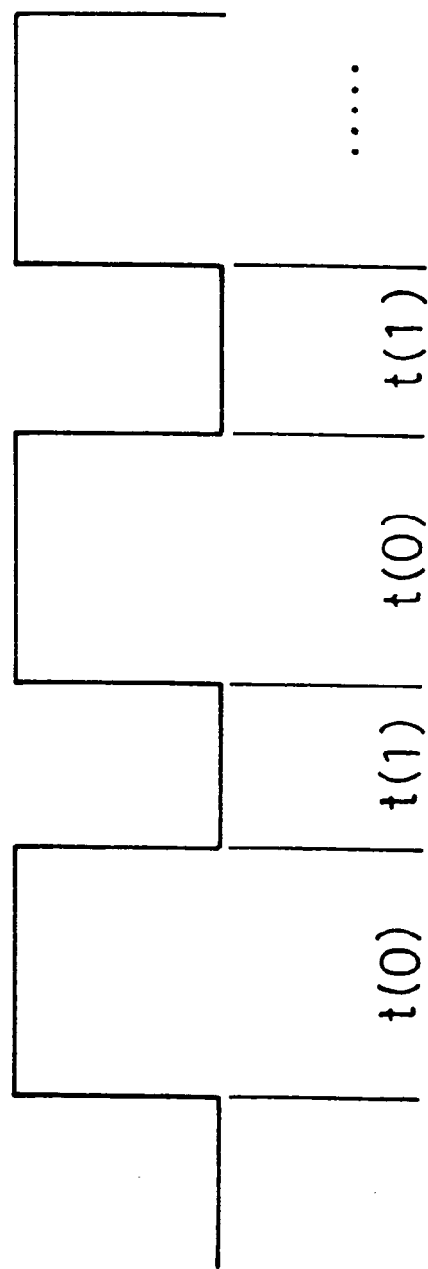
FIG. 2 is a waveform chart showing an FG pulse signal outputted by an FG sensor and a waveform shaping circuit of the motor speed control device.

The motor 1 is rotated by the motor driving circuit 7, and the rotation information of the motor 1 is detected by the FG sensor 2 as frequency information proportional to the number of rotations. The output of the FG sensor 2 is shaped, by the waveform shaping circuit 3 composed of an amplifier and a comparator (not shown), into the FG pulse signal "a" having a rectangular wave. Then, by the period calculating unit 4, as shown in FIG. 2, two types of period information "b", t(0) and t(1), are calculated from the FG pulse signal "a" so as to be inputted to the FG nonuniformity correcting circuit 5. In the period information "b", t(0) is a rising edge-falling edge period (pulse duration), and t(1) is a falling edge-rising edge period (pulse separation), where the rising edge is used as a reference.

The FG nonuniformity correcting circuit 5, upon receiving the period information "b" and the FG pulse signal "a", detects respective periodic nonuniformity of the periods t(0) and t(1), and after correcting the periodic nonuniformity, the FG nonuniformity correcting circuit 5 outputs, as an actual error signal "d", a difference between the corrected period information "b" (periods t(0) and t(1)) and the target value "c". Then, appropriate phase compensation and servo gain are set by the amplifier 6, and the motor 1 is driven and controlled by the motor driving circuit 7. As described, the motor speed control device of the present embodiment employs a feedback control using the output of the FG sensor 2 as rotation information.

In the present embodiment, as described above, for detection of a period, the periods t(0) and t(1) are detected. This makes it possible to reduce the detection time in half compared with the normal case where detection is carried out once per one pulse period, thereby having an advantage in widening a control band.

However, in the periods t(0) and t(1), due to a deviation of the threshold level of the comparator of the waveform shaping circuit 3 from the midpoint (mesial point) level of the FG pulse signal "a", a duty error is generated even when there is no actual change in the rotation speed. The duty error causes periodic nonuniformity, and is superimposed on the period information "b" as an error. Further, the error thus superimposed causes instability in the motor rotation so that the motor noise is increased.

As a counter measure, in the motor speed control device of the present embodiment, the FG nonuniformity correcting circuit 5 detects, per rotation of the motor 1, respective periodic nonuniformity of the rising edge-falling edge period t(0) and the falling edge-rising edge period t(1) of N (here, one) pulse signal(s) "a". That is to say, the FG nonuniformity correcting circuit 5 detects respective periodic nonuniformity of the periods t(0) and t(1) of 2×N (here, 2×1) period information "b" so as to obtain a difference between the period information "b", whose periodic nonuniformity has been corrected, and the target value "c". Namely, an actual error signal "d" is obtained so as to control the motor rotation speed.

Thus, even in the case where the motor 1 is rotated at a low speed, the FG pulse count per rotation of the motor 1 is low, or a pulse period is long, it is possible to (1) widen a control band of a control system and (2) correct the periodic nonuniformity so as to realize a stable and highly accurate motor rotation. Also, because the servo gain can be increased, it is possible to realize an even more stable and highly accurate motor rotation.

Note that, it is possible to realize the first FG nonuniformity correcting circuit using software as internal processing of a controlling microcomputer. In such a case, it is not required to additionally provide the circuit.

Also, in the case of reversing the rotation direction of the motor 1, when the rising-edge is to be used as a reference as above, the period information "b" is read out in the reversed order from the period t(1) to the period t(0). Thus, in such a case, the correction should be carried out accordingly.

The following describes the FG nonuniformity correcting circuit 5.

Figure 3:
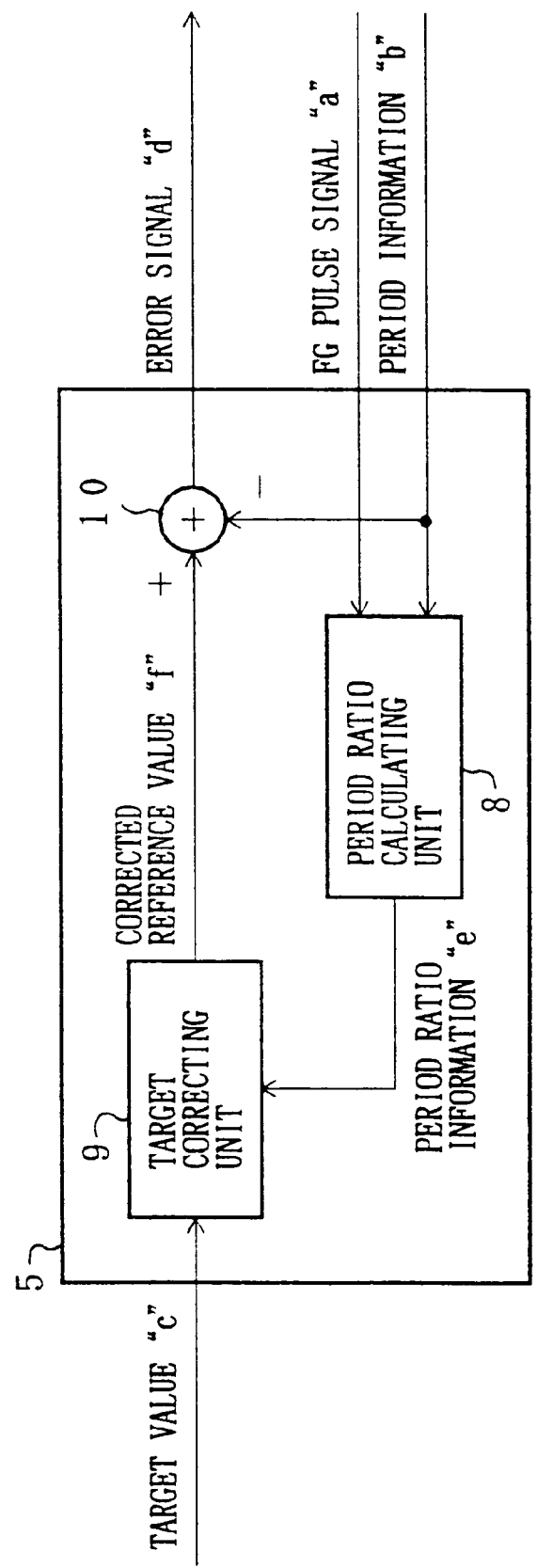
FIG. 3 is a block diagram showing one structure of an FG nonuniformity correcting circuit of the motor speed control device.

As shown in FIG. 3, the FG nonuniformity correcting circuit 5 is provided with, for example, a period ratio calculating unit (first period ratio calculating means) 8, a target correcting unit (first target correcting means) 9, and an adder (first error signal calculating means) 10.

The period ratio calculating unit 8 receives the period information "b" (t(0) and t(1)) and the FG pulse signal "a", and calculates period ratio information "e" (td(0) and td(1)) of each period so as to output the period ratio information "e" to the target correcting unit 9. That is to say, the period ratio information "e" (td(0) and td(1)) is information of periodic nonuniformity such as a duty error and a phase error, in which an actual motor speed fluctuation is removed from the period information b (t(0) and t(1)). For example, the period ratio information "e" (td(0) and td(1)) is the ratio of the period t(0) to the period t(1) with respect to one FG pulse period.

The target correcting unit 9 receives (1) for example, a reference value of one FG pulse period as the target value "c" and (2) the period ratio information "e" as a correction value. In response to this, the target correcting unit 9 outputs a corrected reference value "f" prepared by dividing the target value "c" by the proportion of the correction value.

The corrected reference value "f" is determined by multiplying, for example, the target value "c" and a correction value corresponding to the period information "b". Specifically, when the period ratio information "e" (td(0) and td(1)) are respectively 0.4 and 0.6, and the target value "c" is 100, the corrected reference value "f" upon detecting t(0) becomes 40 (c×td(0)=100×0.4=40), and the corrected reference value "f" upon detecting t(1) becomes 60 (c×td(1)=100×0.6=60).

The difference between the corrected reference value "f" and the period information "b" (f−b) is calculated by the adder 10 so as to obtain an actual error signal "d" from which the periodic nonuniformity has been removed. Thereafter, the motor 1 is driven and controlled by the amplifier 6 and the motor driving circuit 7 of FIG. 1.

As described, by calculating the period ratio information "e", it is possible to obtain an actual error signal "d" in which it is ensured that only the periodic nonuniformity information of each period information "b" (t(0) and t(1)) has been removed. Also, by controlling the motor 1 with the actual error signal "d" thus obtained, it is possible to (1) widen a control band of the control system, and (2) realize a stable and highly accurate motor rotation. Note that, it is effective that the period ratio information "e" is the ratio of the period t(0) to the period t(1) with respect to one FG pulse period. Because by adopting such period ratio information e, it is possible to obtain accurate information which is not dependant on the rotation speed of the motor while calculating the period ratio.

Figure 4:
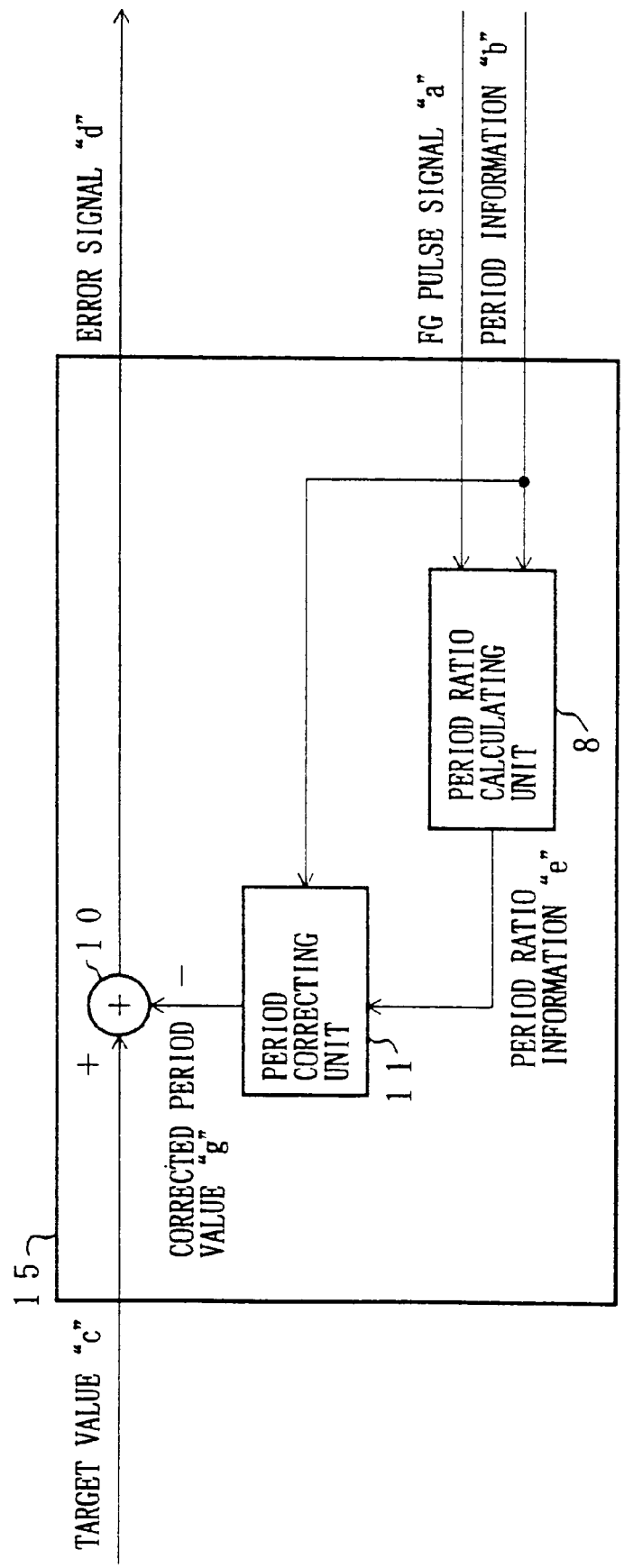
FIG. 4 is a block diagram showing another structure of the FG nonuniformity correcting circuit of the motor speed control device.

Alternatively, for example, an FG nonuniformity correcting circuit 15 of FIG. 4 may be adopted as the FG nonuniformity correcting circuit 5. The FG nonuniformity correcting circuit 15 is provided with a period ratio calculating unit (first period ratio calculating circuit) 8, an adder (second error signal calculating circuit) 10, and a period correcting unit (first period correcting circuit) 11.

In the FG nonuniformity correcting circuit 15, period information "b" and period ratio information "e", which is an output of the period ratio calculating unit 8, are inputted to the period correcting unit 11. The period correcting unit 11 removes periodic nonuniformity from the period information "b" so as to normalize the period information "b", and the value thus normalized is outputted as a corrected period value "g" to the adder 10. Namely, in the period correcting unit 11, the period information "b" is converted, based on the period ratio information "e", to period information of one FG pulse period corresponding to the target value "c" of one FG pulse period. The period information thus converted is then outputted to the adder 10 as a corrected period value "g".

The corrected period value "g" is determined by dividing, for example, the period information "b" by the corresponding correction value. The adder 10 calculates the difference between, for example, (1) the target value "c" which is a reference value of one FG pulse period and (2) the corrected period value "g" so as to obtain an actual error signal "d" from which the periodic nonuniformity has been removed. Thereafter, the motor 1 is controlled and driven by the amplifier 6 and the motor driving circuit 7 of FIG. 1.

As described, by normalizing each period information "b" in accordance with the period ratio information "e" so as to obtain the corrected period value "g", it is possible to remove a gain difference generated due to the periodic nonuniformity.

Thus, with the described arrangement, it is possible to obtain the actual error signal "d" in which it is ensured that only the periodic nonuniformity information of each period information b is removed. Further, by controlling the motor 1 with the actual error signal "d" thus obtained, it is possible to (1) widen a control system of the control system, and (2) realize a stable and highly accurate motor rotation.

Incidentally, in the described arrangement, the period information "b" is normalized. This makes it possible to remove a gain difference of a speed error due to a difference in period ratios of respective periods.

The following will describe such an effect. For example, when the period ratio information "e", $td(0)$ and $td(1)$, are respectively 0.2 and 0.8, the target value "c" is 100, and the period information "b", $t(0)$ and $t(1)$, are respectively 20 and 80 when the speed error is not found, if a speed error of +1 percent is superimposed on the period information "b", the period information "b", $t(0)$ and $t(1)$, respectively become 20.2 and 80.8. Here, if the speed error value is determined by a method in which the target value "c" is corrected in accordance with the period ratio information "e", the speed error values of the periods $t(0)$ and $t(1)$ respectively become −0.2 $((c \times td(0)) - t(0) = 20 - 20.2 = -0.2)$ and −0.8 $((c \times td(1)) - t(1) = 80 - 80.8 = -0.8)$. The speed error values of the periods $t(0)$ and $t(1)$ are different despite of the fact that the periods $t(0)$ and $t(1)$ are both subjected to the speed error of 1 percent. This causes a difference in the servo gain.

However, in the arrangement of the present embodiment, the period information "b" is normalized so as to determine a difference from the reference value. Thus, the speed error values of the periods $t(0)$ and $t(1)$ both become −1 ($c - g = c - (t(0)/td(0)) = 100 - 20.2/0.2 = -1$) and ($c - g = c - (t(1)/td(1)) = 100 - 80.8/0.8 = -1$). Since the respective speed error values of the periods $t(0)$ and $t(1)$ are the same, it is possible to obtain an actual speed error "d" which does not cause a difference in the servo gain. Therefore, an optimum gain characteristic is obtained.

As described, when the periodic nonuniformity is insignificant, that is to say, when a precise adjustment of the servo gain is not required, due to its simplicity, it is preferable to adopt a method in which the target value "c" is corrected without normalizing the period information "b". On the other hand, when a precise adjustment of the servo gain is required, for example, when the period ratio is large, a large effect can be obtained by adopting, as in the present embodiment, a method in which the period information "b" is normalized.

Note that, it is effective that the period ratio information "e" is the ratio of the period $t(0)$ to the period $t(1)$ with respect to one FG pulse period because by adopting such a period ratio information "e", it is possible to obtain accurate information which is not dependant on the motor rotation speed while calculating the period ratio.

Figure 5:
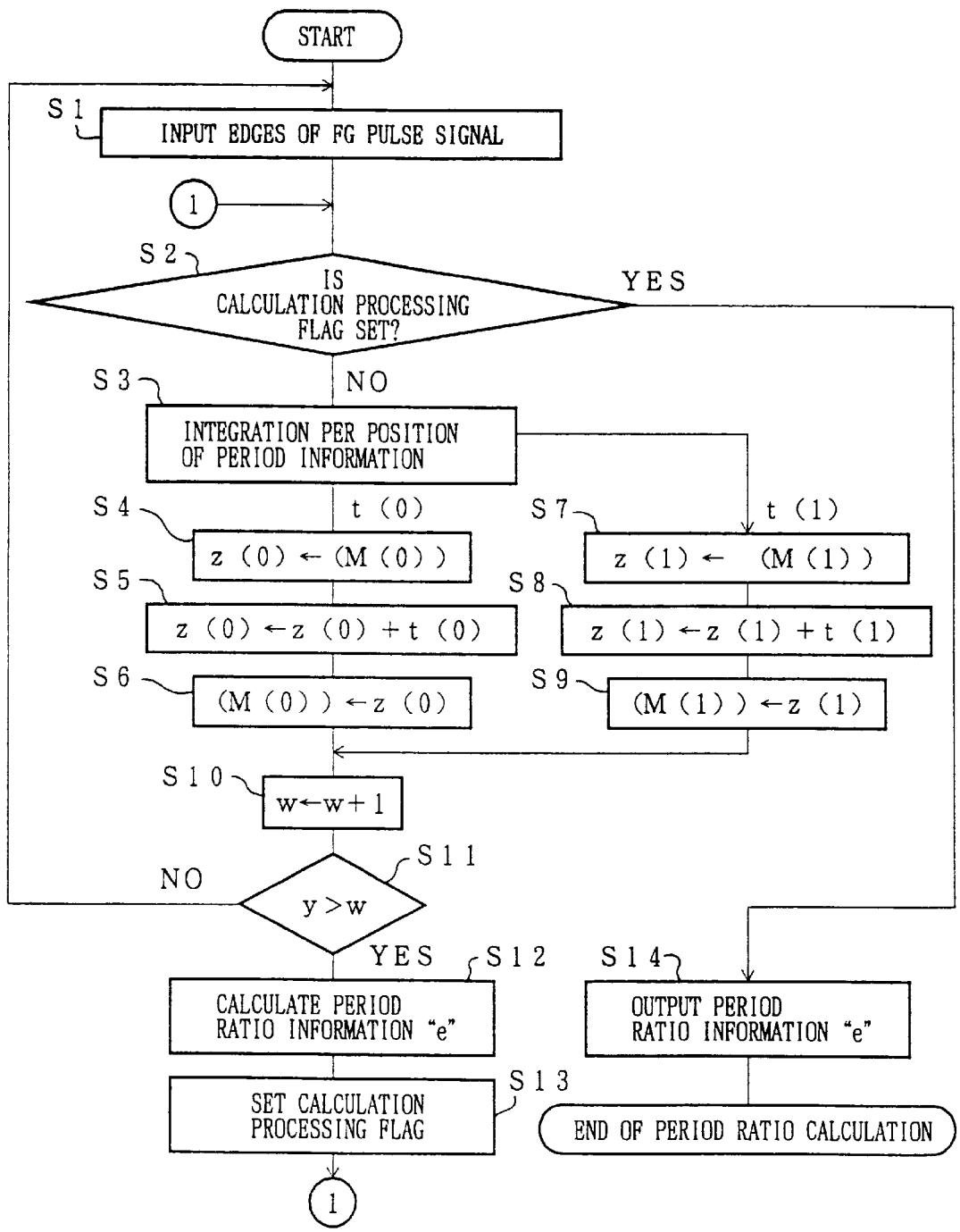
FIG. 5 is a flowchart showing an operation of the FG nonuniformity correcting circuit of the motor speed control device.

The following will describe an example of an operation of the period ratio calculating unit 8 of the FG nonuniformity correcting circuits 5 and 15 referring to the flowchart of FIG. 5. Note that, prior to main processing, variables and memories are initialized. However, in FIG. 5, explanations thereof are omitted. Also, normally, the frequency of the FG pulse signal is sufficiently high compared with the response characteristic of the motor 1 so that in adjacent periods such as the period $t(0)$ and the period $t(1)$, a motor speed fluctuation rarely occurs. Thus, it can be certain that the period difference in the period $t(0)$ and the period $t(1)$ is due to periodic nonuniformity. The operation of the period ratio calculating unit 8 takes an advantage of this fact.

As shown in FIG. 5, when the respective edges of the FG pulse signals $a(0)$ and $a(1)$ of FIG. 2 are inputted (S1), it is judged whether a calculation processing flag is set (S2).

If it is judged in S2 that the calculation processing flag is not set, a separation process of the period $t(0)$ and the period $t(1)$ of the detected period information "b" is carried out (S3). In the case where the detected period information "b" is the period $t(0)$, the contents of an address $M(0)$ in a memory is read out to $z(0)$ (S4). Note that, $(M(0))$ in the text and Figures represents the contents of the address $M(0)$ in the memory.

Thereafter, respective values of $z(0)$ and the period $t(0)$ are added, and the resulting value is represented by $z(0)$, replacing the old value (S5). The $z(0)$ is then stored in the address $M(0)$ in the memory (S6). This makes it possible to store the integrated value of the period $t(0)$ in the address $M(0)$ in the memory.

On the other hand, in the case where the detected period information "b" is the period $t(1)$, similar processes respectively corresponding to S4, S5, and S6 are carried out in S7, S8, and S9.

Then, the periods $t(0)$ and $t(1)$ are respectively stored in $(M(0))$ and $(M(1))$ (S6, S9). Thereafter, a process is carried out so as to increase the value of a counter "w" by 1 increment (S10), and (a) the value of the counter "w" thus prepared and (b) a predetermined value "y" ($y \geq 2$, where y is an integer) which has been arbitrary set are compared (S11).

When "y" is not greater than "w", the sequence returns to S1, and another FG pulse signal is inputted.

Namely, in S11, it is judged whether the period integration for correcting the FG nonuniformity has been finished. Also, the predetermined value "y", which has been inputted beforehand, is the number of times the integration should be carried out, whereas the value of "w" is the number of times the integration has been carried out.

In the case where it is judged in S11 that the predetermined number of integration has been finished, by using respective values of the addresses $M(0)$ and $M(1)$ in the memory, the ratio of the period $t(0)$ to the period $t(1)$ with respect to one FG pulse period is determined so as to calculate the period ratio information "e" ($td(0)$ and $td(1)$) (S12). The period ratio information "e" is determined, for example, by the following equation:

$$td(0) = (M(0))/[(M(0)) + (M(1))]$$

Then, upon setting the calculation processing flag in S13, the sequence returns to S2, and the period ratio information "e" respectively corresponding to the periods $t(0)$ and $t(1)$ are outputted in S14.

Specifically, the period ratio information $td(0)$ and the period ratio information $td(1)$ are respectively outputted in accordance with the period t(0) and the period t(1). The corrected reference value "f" or the corrected period value "g" is calculated by using the period ratio information "e" thus outputted so as to obtain the actual error signal "d".

As described, in the described arrangement, the period ratio information "e" is calculated from values respectively obtained by integrating y times (a) the period information of the block t(0) for the period t(0) and (b) the period information of the block t(1) for the period t(1). By integrating y times the period information "b", a period ratio deviation due to a sudden fluctuation of the motor speed is averaged and removed. As a result, it is possible to detect accurate period ratio information "e" having only the periodic nonuniformity which should be detected.

In the described arrangement, the FG nonuniformity correction is not carried out until the period information "b" is integrated y times and the period ratio calculation is finished.

For this reason, because the speed detecting period becomes long until the FG nonuniformity correction is carried out, it is preferable to control the rotation speed of the motor in accordance with one FG pulse period (t(0)+t(1)) which is known to be accurate. Here, the value of y is related to the number of motor rotations of fewer than one rotation to a few rotations at the most. Hence, the motor speed control device is not adversely affected.

Alternatively, not limiting to the above-arrangement, it is also possible to have an arrangement wherein, for example, the period ratio information "e" is determined before shipping the device and the predetermined period ratio information "e" corresponding to each period is read out. With this arrangement, the effect of the FG nonuniformity correction can be obtained immediately after the start of the motor rotation, and the motor controlling process can be simplified.

Note that, in the present embodiment, at the time of calculating the period ratio information "e", if there is (a) no change in the average speed of the motor (referred to as speed drift, hereinafter) and (b) no fluctuation of the motor speed, namely, if the motor speed is the same at the start and the end of transferring of the period information "b", an accurate calculation of the period ratio information "e" can be realized. However, in practice, since the calculation is carried out while controlling the motor speed, it is possible that the effect as desired is not obtained. Nevertheless, because the speed drift and the motor speed fluctuation are usually within mere 1 percent, the error of the period ratio information due to the speed drift and the motor speed fluctuation is negligible in an actual use.

Also, in order to obtain highly accurate period ratio information "e", it is effective to calculate the period ratio information "e" while the motor 1 is rotated at a speed higher than the normal speed since this reduces the occurrence of the motor speed fluctuation.

Figure 6:
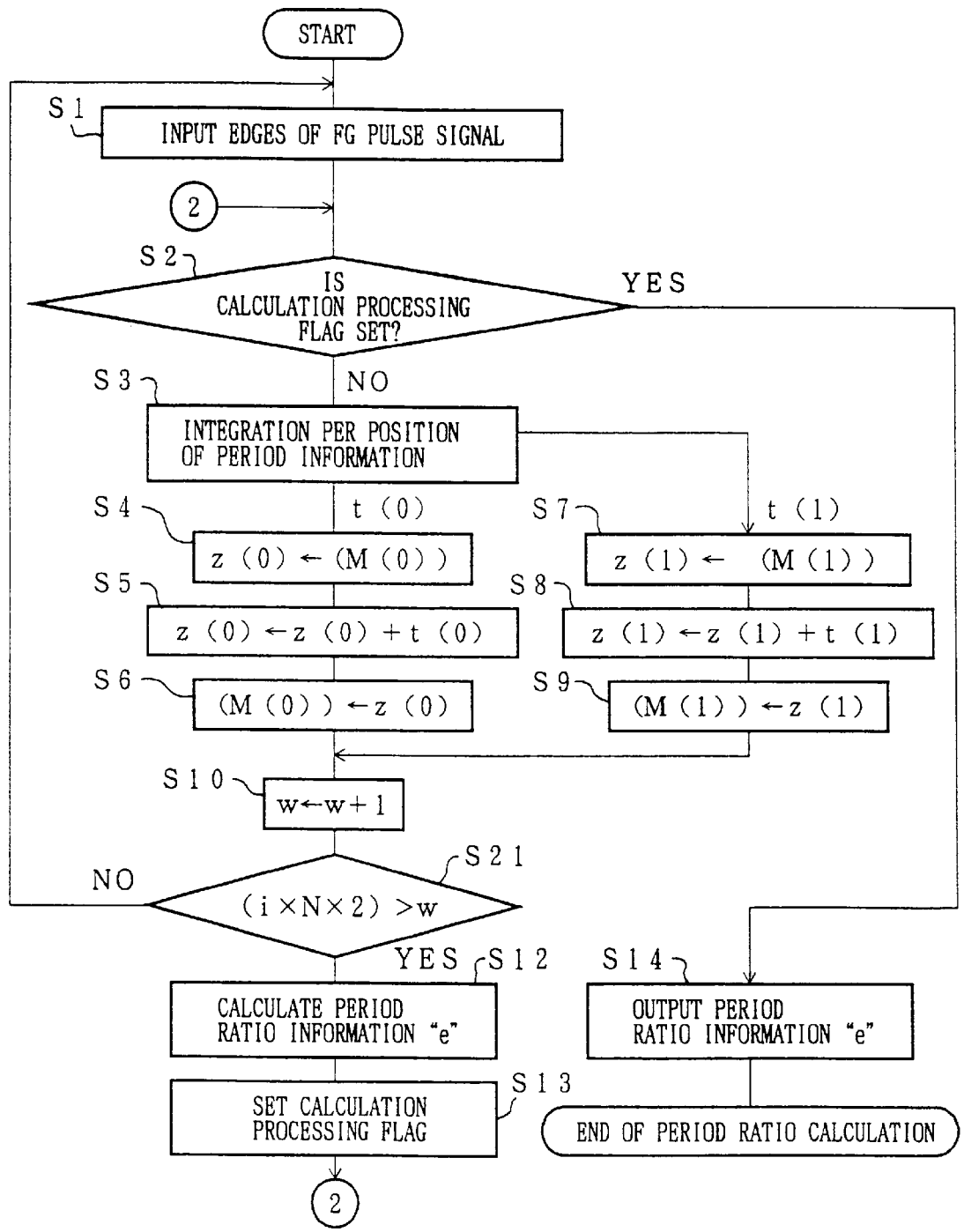
FIG. 6 is a flowchart showing an operation of the FG nonuniformity correcting circuit wherein the number of input integrations of an FG pulse signal for a calculation of period ratio information in the motor speed control device is i×N÷2.

The following will describe another example of the period ratio calculation by the period ratio calculating unit 8 referring to the flowchart of FIG. 6.

The flowchart of FIG. 6 differs from the flowchart of FIG. 5 in S11. Namely, in S11 of FIG. 5, the number of times the integration should be carried out is set arbitrarily, yet in the flowchart of FIG. 6, the number of times the integration should be carried out is i×N×2 (i>1, where i is an integer) where N denotes the number of FG pulses per one motor rotation (S21). In short, integration information during i rotations of the motor is adopted.

Normally, the main frequency of the motor speed fluctuation is an integral multiple of the frequency of the motor rotation, and by integrating the period information for one rotation of the motor, it is possible to average and effectively remove the speed fluctuation with certainty. Note that, it is more effective if the integration is carried out for two rotations or more of the motor.

As described, in this example, the period information "e" is calculated from values respectively determined by integrating, during i rotations of the motor, the period information of the block t(0) and the period information of the block t(1) for the period t(0) and the period t(1), respectively. By carrying out integration in this manner, it is possible to average and remove the period ratio deviation due to a sudden fluctuation of speed. As a result, it is possible detect accurate period ratio information "e" including only the periodic nonuniformity which should be detected.

In the described arrangement, the FG nonuniformity correction is not carried out until the period information is integrated i×N×2 times and the period ratio calculation is finished.

For this reason, because the speed detecting period becomes long until the FG nonuniformity correction is carried out, it is preferable to control the rotation speed of the motor in accordance with one FG pulse period (t(0)+t(1)) which is known to be accurate. Here, the number of motor rotations is merely in a range of one rotation to a few rotations at the most. Hence, the motor speed control device is not adversely affected.

Alternatively, not limiting to the above-arrangement, it is also possible to have an arrangement wherein, for example, the period ratio information "e" is determined before shipping the device and the predetermined period ratio information "e" corresponding to each period is read out. With this arrangement, the effect of the FG nonuniformity correction can be obtained immediately after the start of the motor rotation, and the motor controlling process can be simplified.

Note that, in the described arrangement, at the time of calculating the period ratio information, if there is no speed drift and the motor speed fluctuation, namely, if the motor speed is the same at the start and the end of transferring of the period information, an accurate calculation of the period ratio information can be realized. However, in practice, since the calculation is carried out while controlling the motor speed, it is possible that the effect as desired is not obtained. Nevertheless, because the speed drift and the motor speed fluctuation are usually within mere 1 percent, the error of the period ratio information due to the speed drift and the motor speed fluctuation is negligible in an actual use.

Also, in order to obtain highly accurate period ratio information "e", it is effective to calculate the period ratio information "e" while the motor 1 is rotated at a speed higher than the normal speed since this reduces the occurrence of the motor speed fluctuation.

Figure 7:
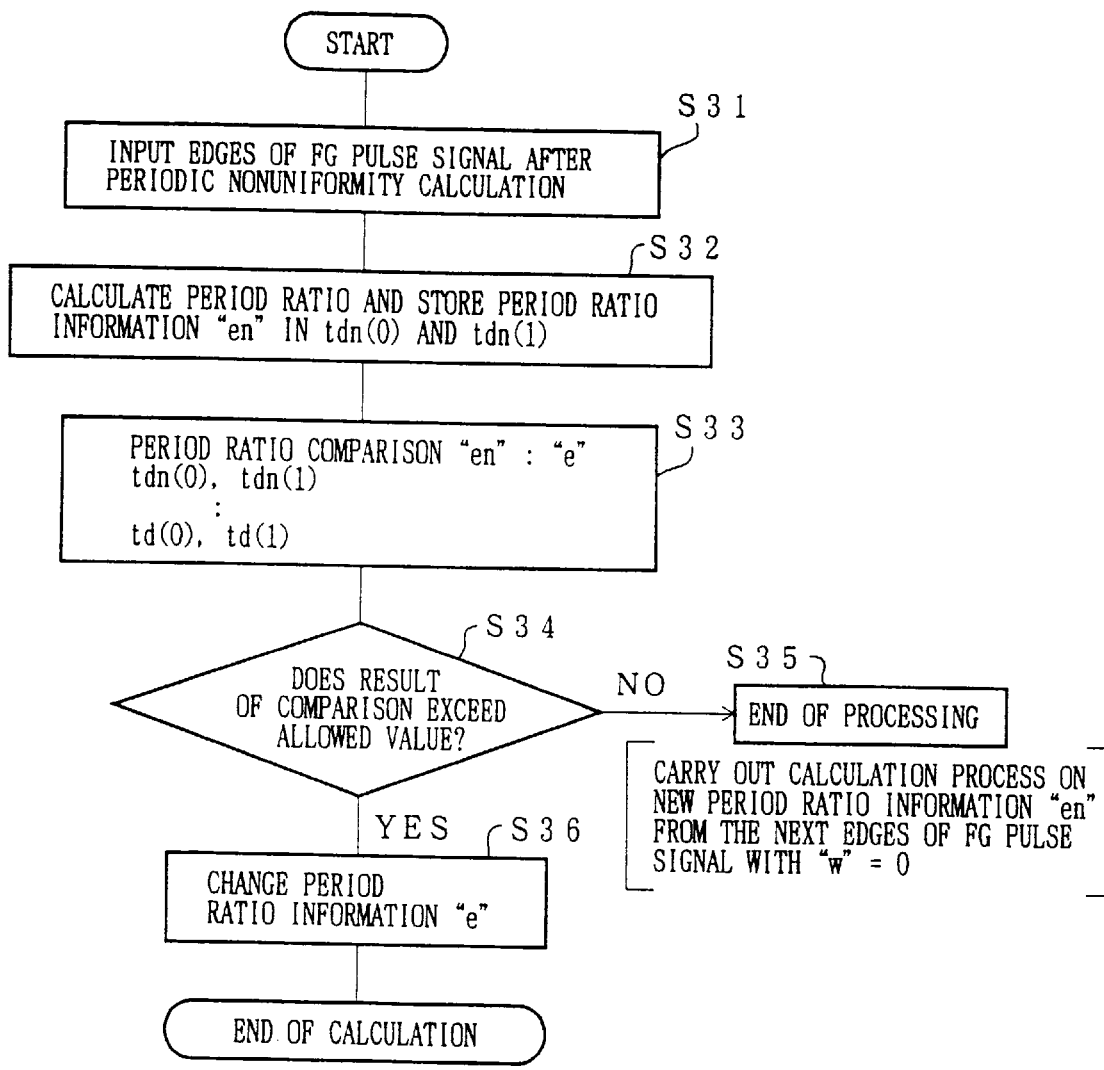
FIG. 7 is a flowchart of a motor speed control device in accordance with second embodiment of the present invention showing an operation of the FG nonuniformity correcting circuit.

The following will describe second embodiment of the present invention referring to FIG. 7. Note that, for convenience, members having the same functions as the members indicated in the first embodiment are given the same reference numerals, and the explanations thereof are omitted.

In the first embodiment, once the period ratio information "e" is calculated, the calculation thereof is not repeated so that (1) the FG nonuniformity correction is carried out one after another by the correction value determined from the first calculated period ratio information "e" or (2) the corrected information is read out.

In the present embodiment, the FG nonuniformity correction and a speed controlling calculation etc. are carried out in accordance with the input of the FG pulse signal "a", and a period ratio calculating process is repeatedly carried out continuously even after the period ratio is calculated.

The following will describe the operation of the FG nonuniformity correcting circuit 5 of the present embodiment referring to the flowchart of FIG. 7. Note that, in this flowchart, variables and memories are also initialized prior to main processing. However, in FIG. 7, explanations thereof are omitted. Also, the FG nonuniformity correction and the speed controlling calculation etc., which are carried out in an actual operation, are not shown in FIG. 7.

First, when the edge of the FG pulse signal is inputted after the first FG nonuniformity correction and a speed controlling calculation are carried out (S31), the period ratio calculating process is carried out again one after another. Period ratio information "en" calculated in this process is stored as (tdn(0) and tdn(1)) separately from the period ratio information "e" (td(0) and td(1)) used for the current FG nonuniformity correction (S32).

Thereafter, the period ratio information "e" (td(0) and td(1)) used for the current FG nonuniiformity correction and the newly calculated period ratio information "en" (tdn(0) and tdn(1)) are compared with respect to each other (S33). Then, it is judged whether the compared value exceeds a preset allowed value (S34). When it is judged in S34 that the compared value is within the allowed value, the main processing is finished, and after resetting to 0 the number of integrations "w", another calculation of period ratio information "en" is carried out from the next input of the edges of the FG pulse signal (S35).

On the other hand, when it is judged in S34 that the compared value exceeds the allowed value, it is judged that the correction of the periodic nonuniformity is not sufficient so that the period ratio information "e" is changed (S36).

Namely, in S34, it is judged whether the difference between the period ratio information "e" used for the current FG nonuniformity correction and the newly calculated period ratio information "en" is too large. For example, supposing that the allowed value of the difference is set to +1.1 or −0.9, when the difference is within ±10 percent, it is judged that the FG nonuniformity correction is sufficient.

Thus, in the case where the difference is too large, the changing process of the period ratio information "e" is carried out. In the changing process, for example, the period ratio information "e" (td(0) and td(1)) is increased or decreased by a predetermined amount. Although the amount by which the period ratio information "e" is increased or decreased is not limited, it is preferable that the period ratio information "e" is increased or decreased by the amount corresponding to the allowed value of the difference or 1/n (n≧2) of the allowed value of the difference.

For example, when the period ratio information "e" (td(0) and td(1)) are respectively 0.4 and 0.6, supposing that the allowed value of the difference is ±10 percent of td(0), the allowed range of td(0) is 0.36 to 0.44. Here, when the newly detected period ratio information tent (td(0) and td(1)) are respectively 0.5 and 0.5, td(0) is out of the allowed range so that the changing process of the period ratio information "e" is carried out. Also, since the period ratio information "en" is shifted in the plus direction of the allowed range, td(0) of the period ratio information "e" is increased by 10 percent or by the amount of 0.04. Thus, the period ratio information "e" (td(0) and td(1)) after the changing process is 0.44 and 0.56, respectively.

The period ratio information "e" thus changed is then used to carry out the FG nonuniformity correction, thereby ensuring that the periodic nonuniformity is removed.

Namely, in the FG nonuniformity correcting circuit 5, the calculation of the period ratio information is carried out one after another even after the first FG nonuniformity correction is carried out, and the difference between the period ratio information "e" used for the preceding FG nonuniformity correction and the newly detected period ratio information "en" is compared with an allowed error. In the case where the difference between the period ratio information "e" and the period ratio information "en" exceeds the allowed error, the FG nonuniformity correction is carried out in accordance with new period ratio information obtained by increasing or decreasing the period ratio information "e" by a predetermined amount. On the other hand, in the case where the difference between the period ratio information "e" and the period ratio information "en" does not exceed the allowed error, the FG nonuniformity correction is carried out in accordance with the period ratio information "e".

Note that, although the period ratio information "en" is usually compared with the period ratio information "e" used for the current FG nonuniformity correction, the present invention is not limited to this so that, alternatively, it is possible to compare the period ratio information "en" with a predetermined value.

Also, in the changing process, the method by which the period ratio information "e" is increased or decreased is effective in reducing the occurrence of a detection error etc. However, the method is not limited to the specified one. For example, it is possible to adopt a method by which the period ratio information "e" is replaced with newly calculated period ratio information "en".

Further, as a counter-measure process against the detection error, the changing process of S36 is carried out only when the difference in the comparison process of S34 exceeds the allowed value in succession for a several times. This prevents the period ratio information "e" to be unnecessarily changed by period ratio information "en" suddenly detected due to the detection error. Thus, it is ensured that the FG nonuniformity correction is carried out.

As described, the motor speed control device of the present embodiment has an arrangement wherein the period ratio is calculated even after the FG nonuniformity correction is carried out, and a comparison is made between period ratio information "e" carrying out the current FG nonuniformity correction and newly calculated period ratio information "en", and in the case where the resulting value of the comparison exceeds a set value, a correction value carrying out the current FG nonuniformity correction, namely, the value of the period ratio is set again. Thus, the motor speed control device of the present embodiment is particularly effective, for example, in the case where period information is changed by a change in temperature etc. while the motor is running.

The following will describe the third embodiment of the present invention referring to FIG. 8 through FIG. 15. Note that, for convenience, members having the same functions as the members indicated in the first and second embodiment are given the same reference numerals, and the explanations thereof are omitted.

In the first and second embodiment, the motor 1 is provided with one FG sensor 2 (rotation speed detecting circuit) and one waveform shaping circuit 3.

Figure 8:
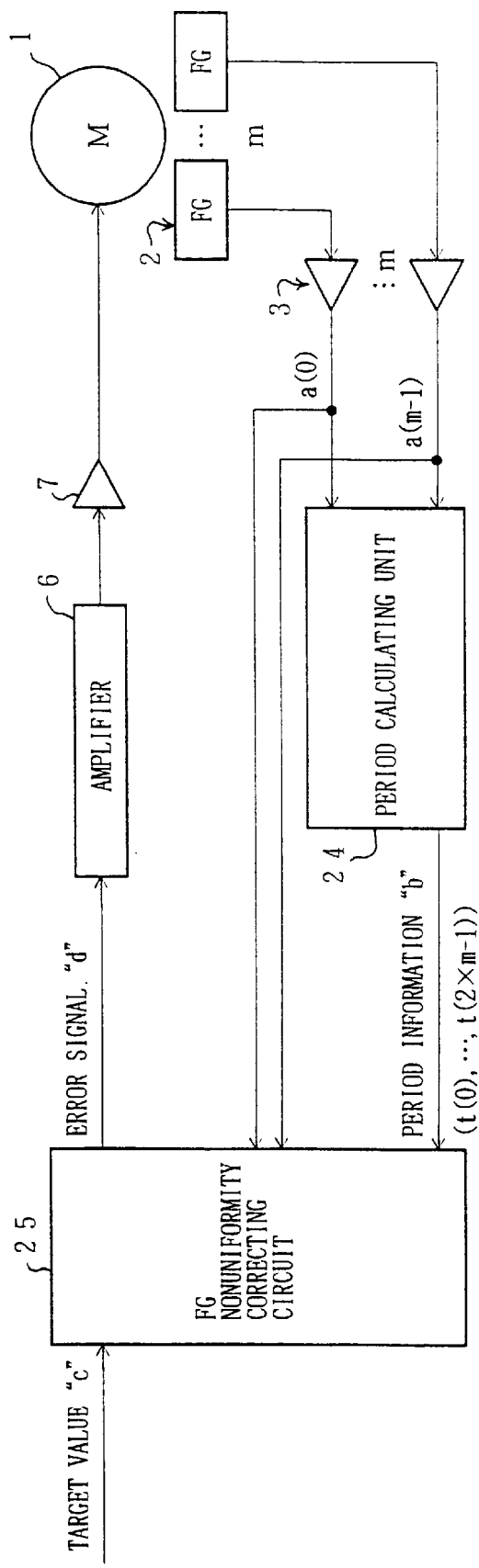
FIG. 8 is a block diagram showing a motor speed control device of third embodiment of the present invention.

However, in the present embodiment, as shown in FIG. 8, the FG sensor 2 (rotation speed detecting circuit) and the waveform shaping circuit 3 are respectively provided in m quantities (m≧2 where m is an integer). Thus, it is possible to obtain FG pulse signals a (0) . . . a (m−1), each having a different phase.

Figure 9:
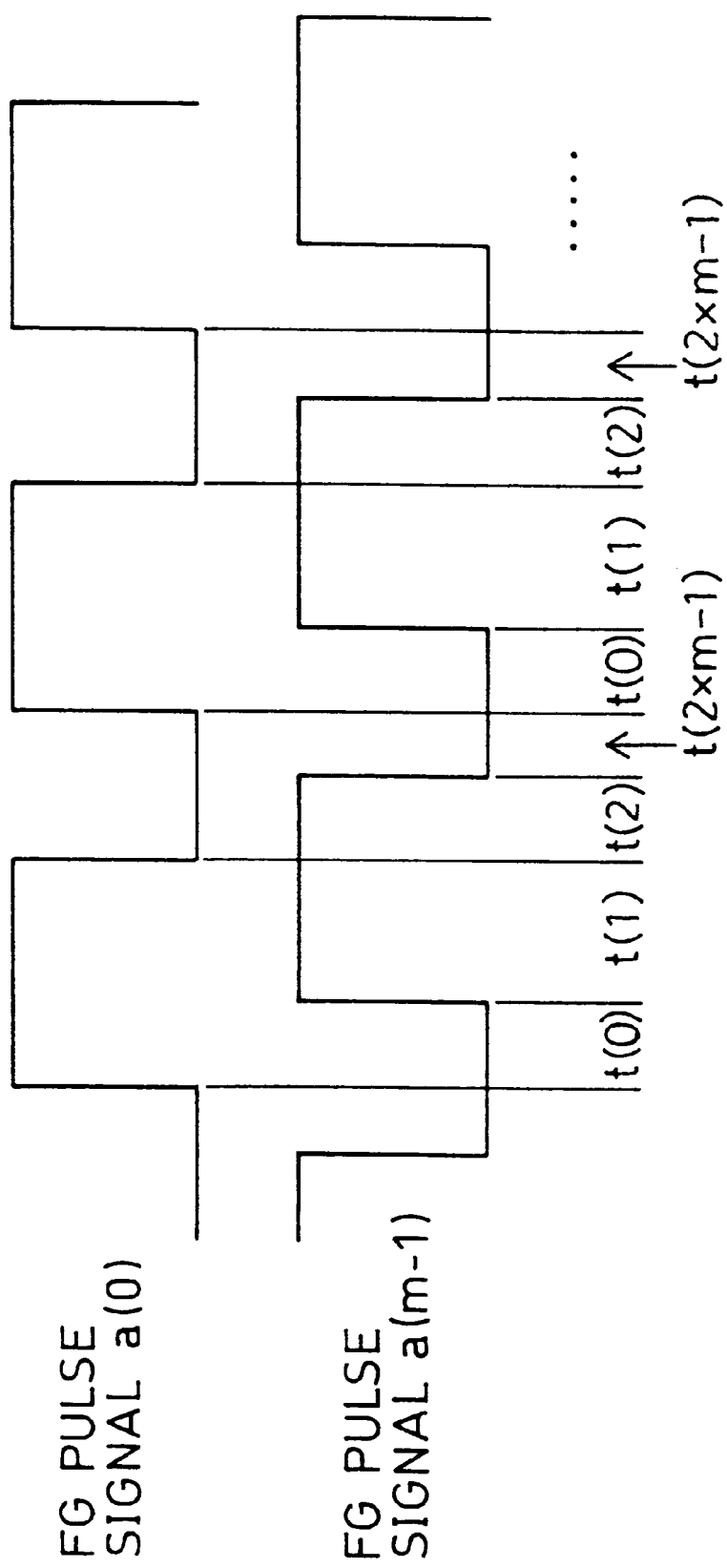
FIG. 9 is a waveform chart showing an FG pulse signal outputted from m FG sensors and m waveform shaping circuits of the motor speed control device.

When the number of the FG sensors 2 is, for example, 2 (m=2), the PG pulse waveform has a shape shown in the FG pulse waveform chart of FIG. 9.

A period calculating unit (second period calculating circuit) 24, using the rising edge of the FG pulse signal "a" (0) as a reference, detects period information "b" (t(0), ..., t(2×m−1)) between each edge. An FG nonuniformity correcting circuit 25 (second FG correcting circuit), using as input the detected period information "b" (t(0), ..., t(2×m−1)) and the FG pulse signal(s) "a" (0) ... a (m−1), detects periodic nonuniformity of the period information "b" (t(0), ..., t(2×m−1)) so as to output, as an error signal "d", the difference between corrected periodic nonuniformity and the target value "c".

In the following process, as in the first and second embodiment, the motor 1 is driven and controlled by the amplifier 6 and the motor driving circuit 7. Note that, the FG nonuniformity correcting circuit 25 and the amplifier 6 function as second controlling means.

In the present embodiment, for detection of a period, periods t(0) ... t(2×m−1) are detected. This, compared with the normal case where detection is carried out once per one pulse period, makes it possible to reduce the detection time by (2×m) thereby having an advantage in widening of the control band.

However, in each period, due to a threshold level error of the comparator of the waveform shaping circuit 3 and a mounting error of the FG sensors 2, a duty error and a phase error are generated. The duty error and the phase error thus generated cause periodic nonuniformity, and are superimposed on the period information as an error. Further, the error thus superimposed causes instability in the motor rotation so that the motor noise is increased.

As a countermeasure, in the motor speed control device of the present embodiment, the rotation speed of the motor is controlled, in one rotation of the motor 1, by using period information "b" between adjacent edges of the rising edge and/or falling edge of N×m FG pulse signals "a". Namely, each of the periods t(0) ... t(2×m−1) of 2×N×m period information "b" is used to control the rotation speed of the motor.

The FG nonuniformity correcting circuit 25 detects periodic nonuniformity between each of the periods t(0) ... t(2×m−1) so as to obtain an actual error signal "d" (the difference between the periodic nonuniformity and the corrected target value "c"), and the rotation speed of the motor is controlled by the actual error signal "d" thud detected.

Thus, even when the motor is rotating at a low speed or the FG pulse counts per rotation of the motor is low, it is possible to (1) widen a control band of the control system by providing pluralities of the FG sensors 2 and waveform shaping circuits 3, and (2) realize a stable and highly accurate motor rotation by the nonuniformity correction.

Also, in the case of reversing the rotation direction of the motor 1, when the rising-edge is to be used as a reference as above, the period information "b" is also read out in the reversed order from the period t(2×m−1) ... to the period t(0). Thus, in such a case, the correction should be carried out accordingly.

Here, in the case where the FG sensor 2 is to be provided in m quantities, it is preferable that the FG sensors 2 are provided in the following manner. Namely, when one pulse of the FG pulse signal is 360°, the m FG sensors 2 should be provided on a position so as to obtain m FG pulse signals which are (180/m)° out of phase with respect to each other. Note that, in the present embodiment, the waveform of the FG pulse signal is a square wave with a duty factor of 0.5.

Figure 10:
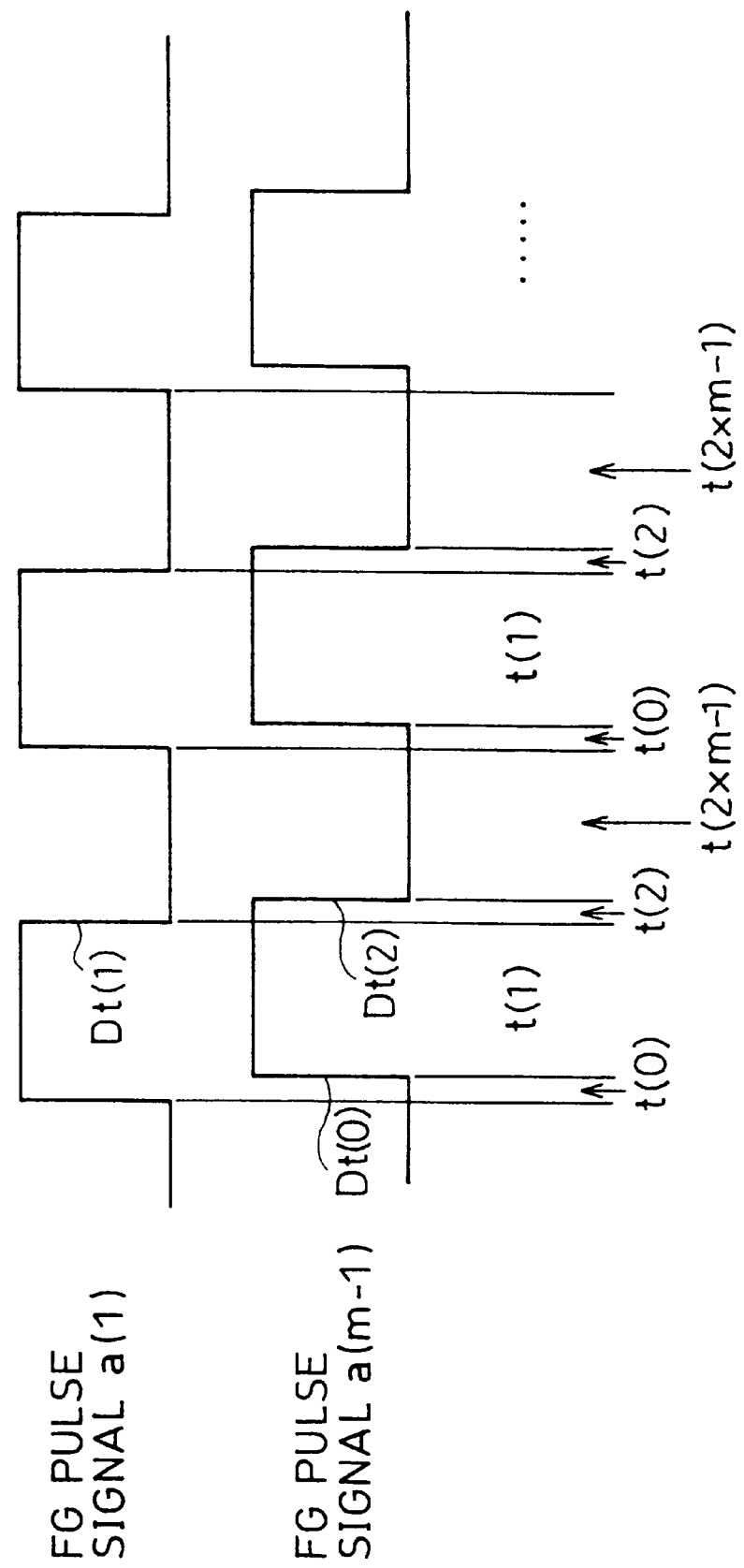
FIG. 10 is a waveform chart showing an FG pulse signal when m FG sensors are provided on an arbitrary position in the motor speed control device.

For example, when the FG sensors 2 are to be provided on an arbitrary position, the FG pulse signals have waveforms shown in FIG. 10.

In FIG. 10, for example, there is a great difference between the period t(0) and the period t(1). This causes a difference in a control period. Normally, the rotation speed control of the motor 1 is carried out with respect to each edge of the FG pulse signal. However, as shown here in FIG. 10, the detecting period is long from the edge Dt(0) when detecting the period t(0) to the edge Dt(1) when detecting the period t(1). Consequently, the control period becomes long.

In the motor speed rotation speed control device of the present embodiment, it is ensured that FG nonuniformity of the FG pulse signal "a" is corrected, and it is possible to correct periodic nonuniformity even when the FG pulse signals have waveforms shown in FIG. 10.

However, the control period is determined by a period between each edge of the FG pulse signal "a". For this reason, in the FG pulse signal "a" of FIG. 10, as described above, it is possible to widen the control band of the control system between the edge Dt(1) and the edge Dt(2) since the control period therebetween is short. On the contrary, the widening of the control band of the control system is not as effective between the edge Dt(0) and the edge Dt(1) since the control period therebetween is long. Thus, on the whole, the widening of the control band of the control system is not so effective.

Thus, when m FG sensors 2 are provided on a position where the phase difference between the FG pulse signals is too small, the effect of FG nonuniformity correction by the plurality of FG sensors 2 is not effective.

Figure 11:
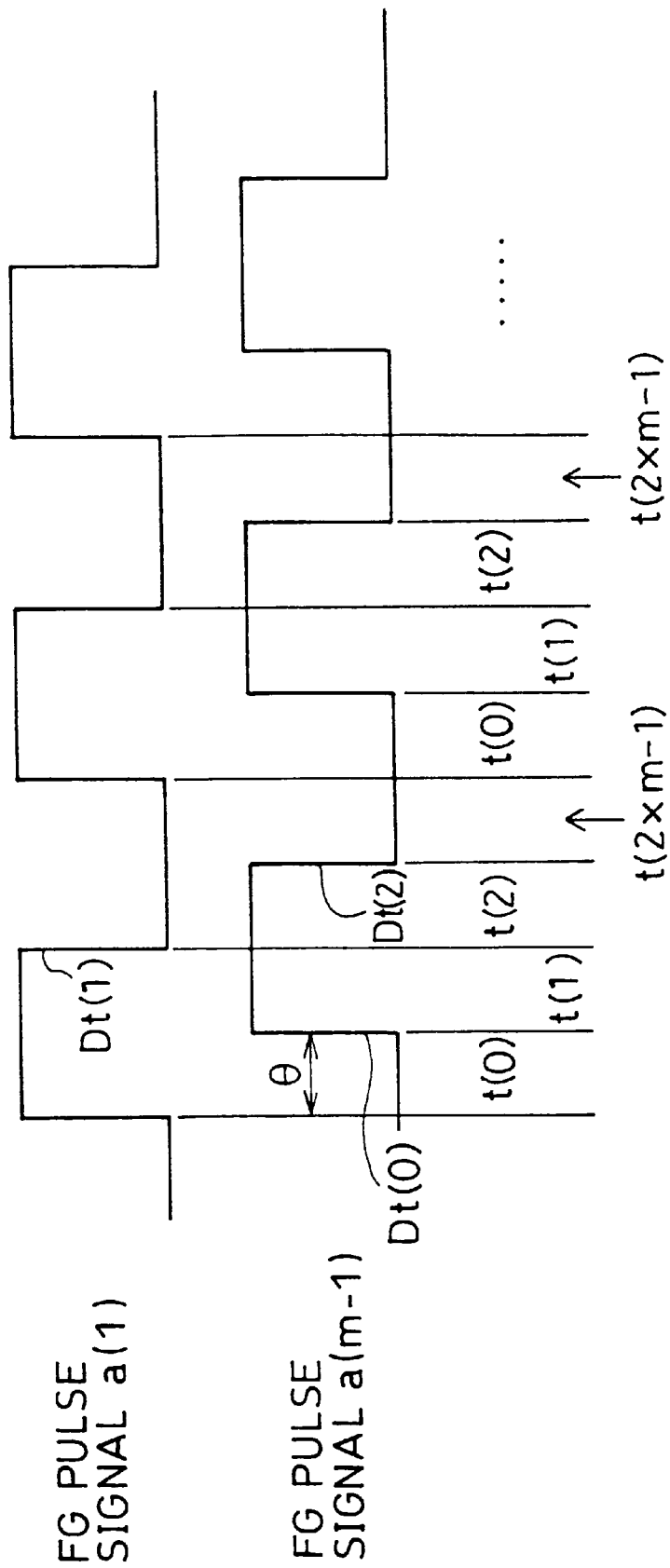
FIG. 11 is a waveform chart showing an FG pulse signal when m FG sensors are provided on a position with a phase difference of 180/m° in the motor speed control device.

As a countermeasure, as shown in FIG. 11, the FG sensors are provided so that the phase difference e of the m FG pulse signals "a" is (180/m)°. This makes it possible to minimize the distance between each edge such as the distance between Dt(0) and Dt(1) and the distance between Dt(1) and Dt(2). This makes (a) the effect of FG nonuniformity correction effective and (b) the detecting period and the control period short by the plurality of FG sensors 2. Thus, it is possible to widen the control band of the control system. Note that, it is not required to make the phase difference θ exactly 180/m°. The same effect can be obtained even when the phase difference θ is substantially 180/m°.

Figure 12:
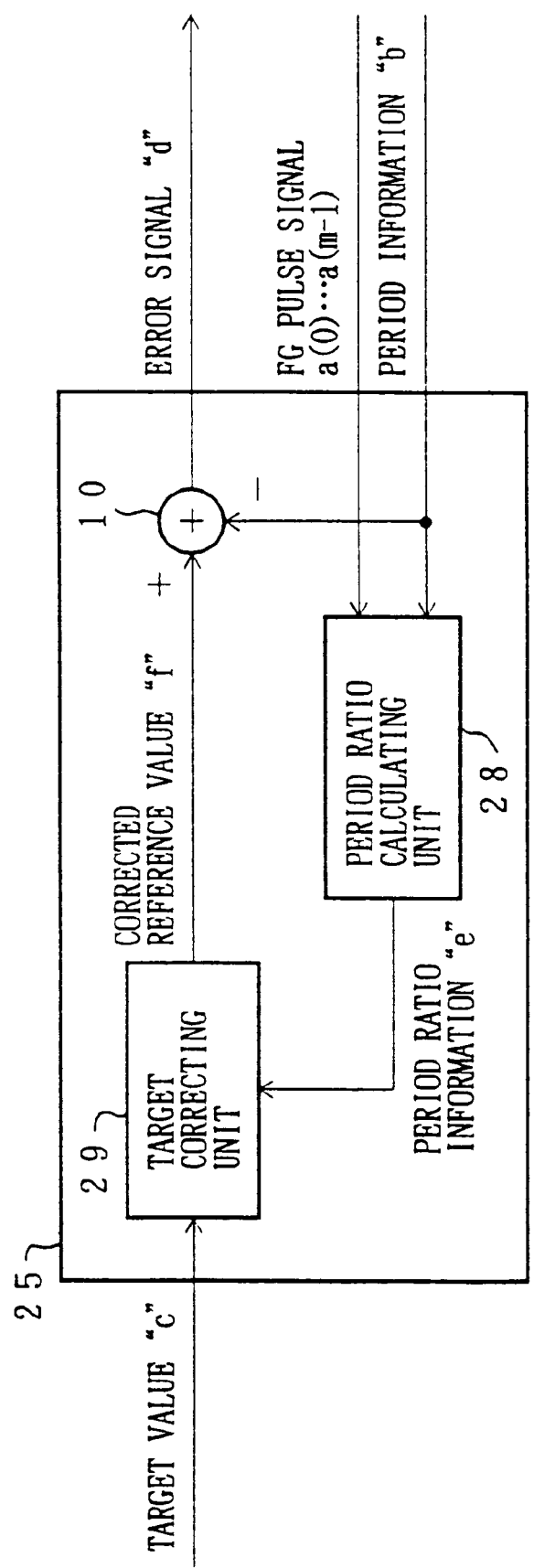
FIG. 12 is a block diagram showing one structure of the FG nonuniformity correcting circuit of the motor speed control device.

The following will describe one example of the arrangement of the FG nonuniformity correcting circuit 25 referring to FIG. 12. Note that, the arrangement is basically the same as the FG nonuniformity correcting circuit 5 of the first embodiment shown in FIG. 3.

In the FG nonuniformity correcting circuit 25, a period ratio calculating unit (second period ratio calculating circuit) 28 receives period information "b" (t(0), ..., t(2×m−1) and FG pulse signal "a" (0) ... a(m−1), and calculates period ratio information "e" (td(0), ..., td(2×m−1)) of each period so as to output the period ratio information "e" thus calculated to a target correcting unit (second target correcting circuit) 29. The period ratio information "e" (td(0), ..., td(2×m−1)) is information of periodic nonuniformity such as a duty error and a phase error, in which an actual motor speed fluctuation is removed from each period information b. For example, the period ratio information "e" (td(0), ..., td(2×m 1)) is the ratio of the periods t(0) ... t(2×m−1) with respect to each other in one FG pulse period.

The target correcting unit 29 receives (1) for example, a reference value of one FG pulse period as the target value "c" and (2) the period ratio information "e" as a correction value. In response to this, the target correcting unit 29 outputs a corrected reference value "f" which is a value prepared by dividing the target value "c" by the proportion of the correction value. The corrected reference value "f" is determined by multiplying, for example, the target value "c" and a correction value corresponding to the period information "b".

Specifically, when the period ratio information "e" (where m=2) td(0), td(1), td(2), and td(3) are respectively 0.1, 0.2, 0.3, and 0.4, and the target value "c" is 100, the corrected reference value "f" upon detecting t(0), td(1), td(2), and td(3) respectively become 10 (c×td(0)=100×0.1=10), 20 (c×td(1)=100×0.2=20), 30 (c×td(2)=100×0.3=10), and 40 (c×td(3)=100×0.4=40).

The difference between the corrected reference value "f" and the period information "b" (f−b) is calculated by the adder (third error signal calculating circuit) 10 so as to obtain an actual error signal "d" from which the periodic nonuniformity has been removed. Thereafter, as shown in FIG. 8, the motor 1 is driven and controlled by the amplifier 6 and the motor driving circuit 7.

With the described arrangement, it is possible to obtain an actual error signal "d" in which it is ensured that only the periodic nonuniformity information of each period information "b" has been removed. Also, by controlling the motor 1 with the actual error signal "d" thus obtained, it is possible to (1) widen a control band of the control system, and (2) realize a stable and highly accurate motor rotation. Note that, as mentioned above, it is effective that the period ratio information "e" is the ratio of the periods t(0) . . . t(2×m−1) with respect to each other in one FG pulse period because by adopting such period ratio information e, it is possible to obtain accurate information which is not dependant on the motor rotation speed while calculating the period ratio.

Figure 13:
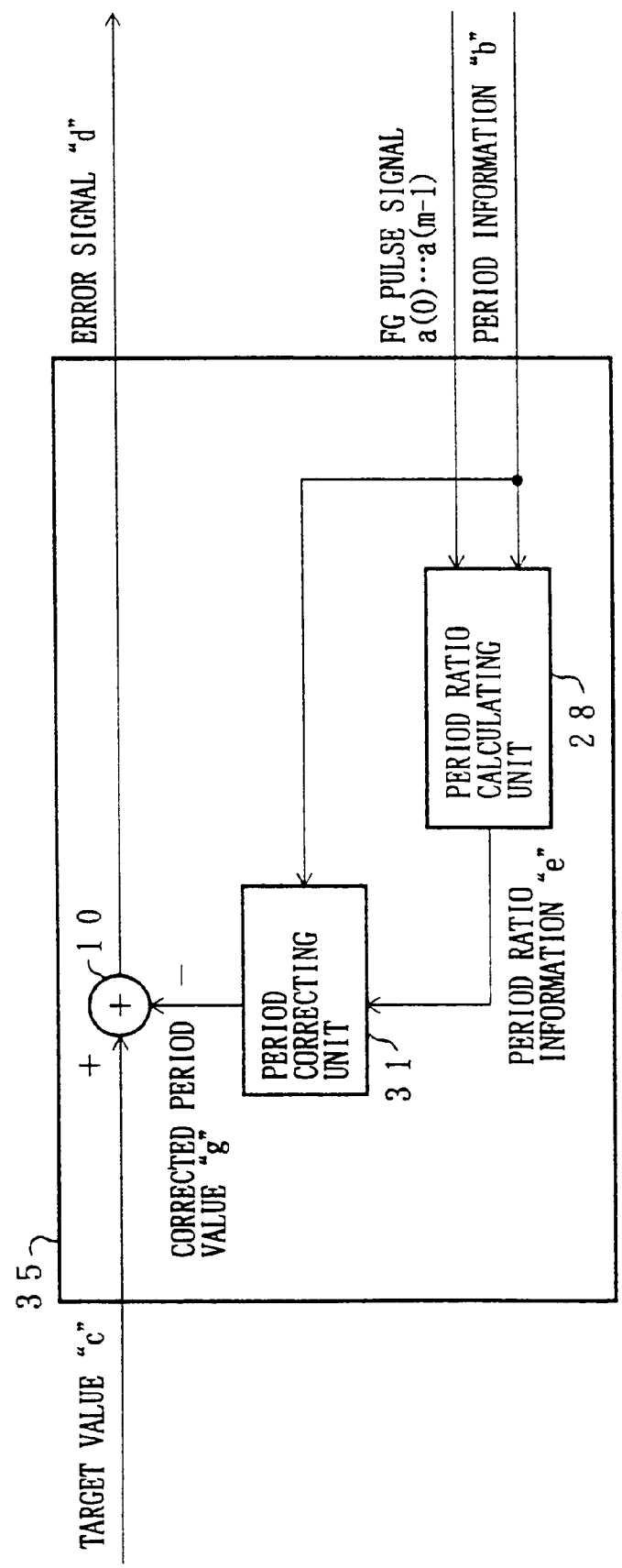
FIG. 13 is a block diagram showing another structure of the FG nonuniformity correcting circuit of the motor speed control device.

The following will describe an FG nonuniformity correcting circuit 35 as another example of the arrangement of the FG nonuniformity correcting circuit 25 referring to FIG. 13. Note that, the arrangement is basically the same as the FG nonuniformity correcting circuit 15 of the first embodiment shown in FIG. 4.

In the FG nonuniformity correcting circuit 35, period information "b" and period ratio information "e", which is an output of the period ratio calculating unit (second period ratio calculating circuit) 28, are inputted to the period correcting unit 31. The period correcting unit 31 removes periodic nonuniformity from the period information "b" so as to normalize the period information "b", and the value thus normalized is outputted as a corrected period value "g" to the adder 10. The corrected period value "g" is determined by dividing, for example, the period information "b" by the corresponding correction value. The adder (fourth error signal calculating circuit) 10 calculates the difference between, for example, (1) the target value "c" which is a reference value of one FG pulse period and (2) the corrected period value "g" so as to obtain an actual error signal "d" from which the periodic nonuniformity has been removed. Thereafter, the motor 1 is controlled and driven by the amplifier 6 and the motor driving circuit 7 of FIG. 8.

Thus, with the described arrangement, it is possible to obtain the actual error signal "d" in which it is ensured that only the periodic nonuniformity information of each period information "b" is removed. Further, by controlling the motor 1 with the actual error signal "d" thus obtained, it is possible to (1) widen a control system of the control system, and (2) realize a stable and highly accurate motor rotation.

Incidentally, in the described arrangement, the period information "b" is normalized. This makes it possible to remove a gain difference of a speed error due to a difference in period ratios of respective periods.

The following will describe such an effect. For example, when the period ratio information "e" (where m=2) td(0), td(1), td(2), and td(3) are respectively 0.1, 0.2, 0.3, and 0.4, the target value "c" is 100, and the periods t(0), t(1), t(2), and t(3) are respectively 10, 20, 30, and 40 when the speed error is not found, if a speed error of +1 percent is superimposed on each of the periods t(0), t(1), t(2), and t(3), the period information "b" t(0), t(1), t(2), and t(3) respectively become 10.1, 20.2, 30.3, and 40.4.

Here, if the speed error value is determined by a method in which the target value "c" is corrected in accordance with the period ratio information "e", the speed error values of the periods t(0), t(1), t(2), and t(3) respectively become −0.1 ((c×td(0))−t(0)=10−10.1=−0.1), −0.2 ((c×td(1))−t(1)=20−20.2=−0.2), −0.3 ((c×td(2))−t(2)=30−30.3=−0.3), and −0.4 ((c×td(3))−t(3)=40−40.4=− 0.4). The speed error values of the periods t(0), t(1), t(2), and t(3) are different despite of the fact that the periods t(0), t(1), t(2), and t(3) are all subjected to the speed error of 1 percent. This causes a difference in the servo gain.

However, in the described arrangement, the period information "b" is normalized so as to determine a difference from the reference value. Thus, the speed error values of the periods t(0), t(1), t(2), and t(3) respectively become −1, (c−g=c−(t(0)/td(0))=100−10.1/0.1=−1), −1(c−g=c−(t(1)/td(1))=100−20.2/0.2=−1), −1(c−g=c−(t(2)/td(2))=100−30.3/0.3=−1), and −1(c−g=c−(t(3)/td(3))=100−40.4/0.4=−1). Since the respective speed error values of the periods t(0), t(1), t(2), and t(3) are the same, it is possible to obtain an actual speed error "d" which does not cause a difference in the servo gain. Therefore, an optimum gain characteristic is obtained.

As described, when the periodic nonuniformity is insignificant, that is to say, when a precise adjustment of the servo gain is not required, due to its simplicity, it is preferable to adopt a method in which the target value "c" is corrected without normalizing the period information "b". On the contrary, when a precise adjustment of the servo gain is required, for example, when the period ratio is large, a large effect can be obtained by adopting the described arrangement.

Note that, it is effective that the period ratio information "e" is the ratio of the periods t(0) . . . t(2×m−1) with respect to each other in one FG pulse period because by adopting such a period ratio information "e", it is possible to obtain accurate information which is not dependant on the motor rotation speed while calculating the period ratio.

Figure 14:
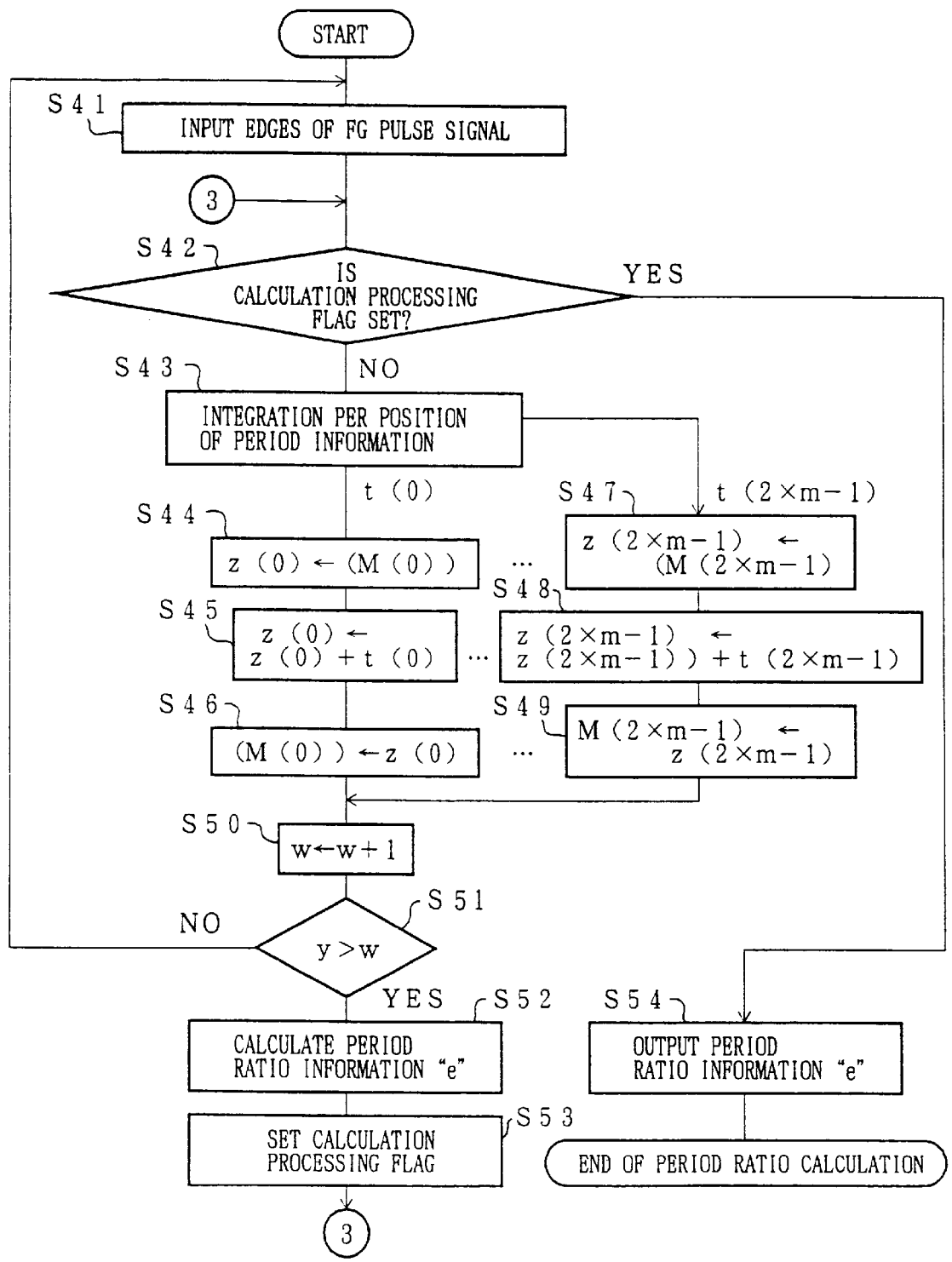
FIG. 14 is a flowchart showing an operation of the FG nonuniformity correcting circuit of the motor speed control device.

The following will describe an example of the operation of the period calculating unit 28 of the FG nonuniformity correcting circuits 25 and 35 referring to the flowchart of FIG. 14. Note that, prior to main processing, variables and memories are initialized. However, in FIG. 5, explanations thereof are omitted. Also, normally, the frequency of the FG pulse signal is sufficiently high compared with the response characteristic of the motor 1 so that in adjacent periods such as the period t(0) and the period t(1), a motor speed fluctuation rarely occurs. Thus, it can be certain that the period difference between the period t(0) and the period t(1) is due to periodic nonuniformity. The operation of the period ratio calculating unit 28 takes an advantage of this fact.

As shown in FIG. 14, when the respective edges of the FG pulse signals a(0) . . . a(m=1) of FIG. 9 are inputted (S41), it is judged whether a calculation processing flag is set (S42).

If it is judged in S42 that the calculation processing flag is not set, a separation process of the periods t(0) . . . t(2×m−1) of the detected period information "b" is carried out (S43). In the case where the detected period information "b" is the period t(0), the contents of an address M(0) in a memory is read out to z(0) (S44).

Thereafter, respective values of z(0) and the period t(0) are added, and the resulting value is represented by z(0), replacing the old value (S45). The z(0) is then stored in the address M(0) in the memory (S46). As a result, the integrated value of the period t(0) is stored in the address M(0) in the memory.

On the other hand, in the case where the detected period information is the period t(2×m−1), similar processes respectively corresponding to S44, S45, and S46 are carried out in S47, S48, and S49.

Then, after each of the periods t(0) . . . t(2×m−1) are respectively stored in (M(0)) and (M(2×m−1)) in S44 through S49, a process is carried out so as to increase the value of a counter "w" by 1 increment (S50), and (a) the value of the counter "w" thus prepared and (b) a predetermined value "y" which has been arbitrary set are compared (S51). When "y" is not greater than "w", the sequence returns to S41, and another FG pulse signal is inputted.

In the case where it is judged in S51 that the predetermined number of integration has been finished, by using respective values of the addresses M(0) . . . M(2×m−1) in the memory, the ratio of the periods t(0) . . . t(2×m 1) with respect to each other in one FG pulse period is determined so as to calculate the period ratio information "e" (td(0) . . . td(2×m−1) (S52). The period ratio information "e" is determined, for example, by the following equation:

$$td(0)=(M(0))/[(M(0))+ \ldots +(M(2\times m-1))]$$

Then, upon setting the calculation processing flag in S53, the sequence returns to S42, and the period ratio information "e" respectively corresponding to the periods t(0) . . . t(2×m−1) are outputted in S54.

Specifically, for the period t(0) and the period t(2×m−1), respectively, the period ratio information td(0) and the period ratio information td(2×m−1) are outputted. The period ratio information "e" thus outputted is used to calculate the corrected reference value "f" or the corrected period value "g" so as to obtain the actual error signal "d".

As described, in the described arrangement, the period ratio information "e" is calculated from values respectively obtained by integrating y times (a) the period information of the block t(0) for the period t(0) and (b) the period information of the block (2×m−1) for the period t(2×m−1). By integrating y times the period information "b", a period ratio deviation due to a sudden fluctuation of the motor speed is averaged and removed. As a result, it is possible to detect accurate period ratio information "e" having only the periodic nonuniformity which should be detected.

In the described arrangement, the FG nonuniformity correction is not carried out until the period information "b" is integrated y times and the period ratio calculation is finished. For this reason, because the speed detecting period becomes long until the FG nonuniformity correction is carried out, it is preferable to control the rotation speed of the motor in accordance with one FG pulse period (t(0)+ . . . +t(2×m−1)) which is known to be accurate. Here, the value of y is related to the number of motor rotations of fewer than one rotation to a few rotations at the most. Hence, the motor speed control device is not adversely affected. Alternatively, not limiting to the above-arrangement, it is also possible to have an arrangement wherein, for example, the period ratio information "e" is determined before shipping the device and the predetermined period ratio information "e" corresponding to each period is read out. With this arrangement, the effect of the FG nonuniformity correction can be obtained immediately after the start of the motor rotation, and the motor controlling process can be simplified.

Note that, in the present embodiment, since the calculation of the period ratio information "e" is carried out while controlling the motor speed, the effect of speed drift and a speed fluctuation are of a concern. Nevertheless, because the speed drift and the motor speed fluctuation are usually within mere 1 percent, the error of the period ratio information due to speed drift and the motor speed fluctuation is negligible in an actual use.

Also, in order to obtain highly accurate period ratio information "e", it is effective to calculate the period ratio information "e" while the motor is rotated at a speed higher than the normal speed since this reduces the occurrence of the motor speed fluctuation.

Figure 15:
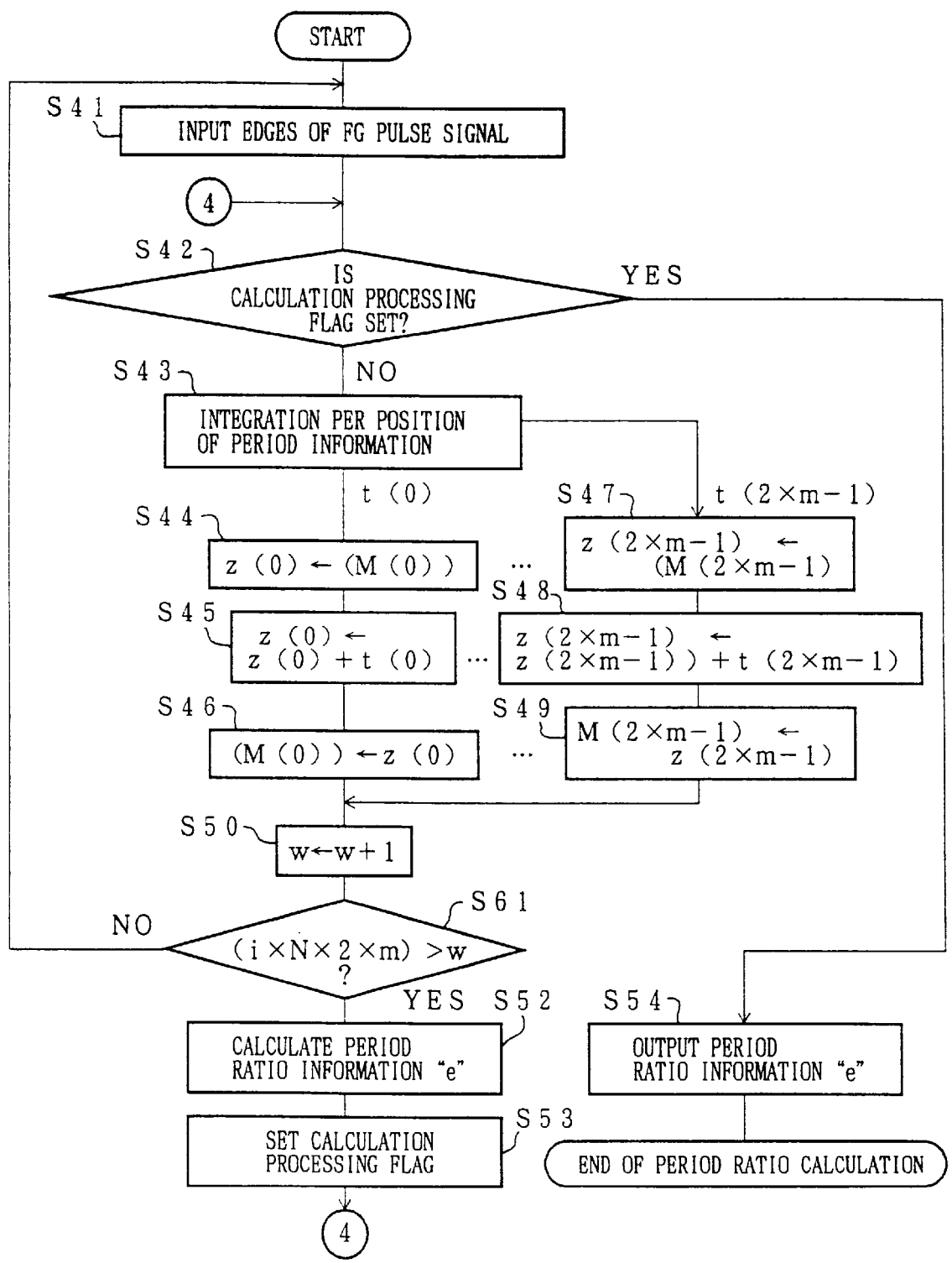
FIG. 15 is a flowchart showing an operation of the FG nonuniformity correcting circuit wherein the number of input integrations of an FG pulse signal for a calculation of period ratio information in the motor speed control device is i×N×2.

The following will describe another example of the period ratio calculation by the period ratio calculating unit 28 referring to the flowchart of FIG. 15.

The flowchart of FIG. 15 differs from the flowchart of FIG. 14 in S51. Namely, in S51 of FIG. 14, the number of times the integration should be carried out is set arbitrarily, yet in the flowchart of FIG. 15, the number of times the integration should be carried out is i×N×2×m (i>1, where i is an integer) where N denotes the number of FG pulses per one motor rotation (S61). In short, integration information during i rotations of the motor is adopted.

Normally, the main frequency of the motor speed fluctuation is an integral multiple of the frequency of the motor rotation, and by integrating the period information for one rotation of the motor, it is possible to average and effectively remove the speed fluctuation with certainty. Note that, it is more effective if the integration is carried out for two rotations or more of the motor.

As described, in this example, the period information "e" is calculated from values respectively determined by integrating, during i rotations of the motor, the period information of the block t(0) and the period information of the block t(2×m−1) for the period t(0) and the period t(2×m−1), respectively. By integrating the period information "b" in this manner, it is possible to average and remove the period ratio deviation due to a sudden fluctuation in speed, thereby permitting to detect accurate period ratio information "e" including only the periodic nonuniformity which should be detected.

In the described arrangement, the FG nonuniformity correction is not carried out until the period information is integrated i×N×2×m times and the period ratio calculation is finished. For this reason, because the speed detecting period becomes long until the FG nonuniformity correction is carried out, it is preferable to control the rotation speed of the motor in accordance with one FG pulse period (t(0)+ . . . +t(2×m−1)) which is known to be accurate. Here, the number of motor rotations is merely in a range of one rotation to a few rotations at the most. Hence, the motor speed control device is not adversely affected. Alternatively, not limiting to the above-arrangement, it is also possible to have an arrangement wherein, for example, the period ratio information "e" is determined before shipping the device and the predetermined period ratio information "e" corresponding to each period is read out. With this arrangement, the effect of the FG nonuniformity correction can be obtained immediately after the start of the motor rotation, and the motor controlling process can be simplified.

Note that, in the present embodiment, since the calculation of the period ratio information "e" is carried out while controlling the motor speed, the effect of speed drift and a speed fluctuation are of a concern. Nevertheless, because the speed drift and the motor speed fluctuation are usually within mere 1 percent, the error of the period ratio information due to speed drift and the motor speed fluctuation is negligible in an actual use.

Also, in order to obtain highly accurate period ratio information "e", it is effective to calculate the period ratio information "e" while the motor is rotated at a speed higher than the normal speed since this reduces the occurrence of the motor speed fluctuation.

Figure 16:
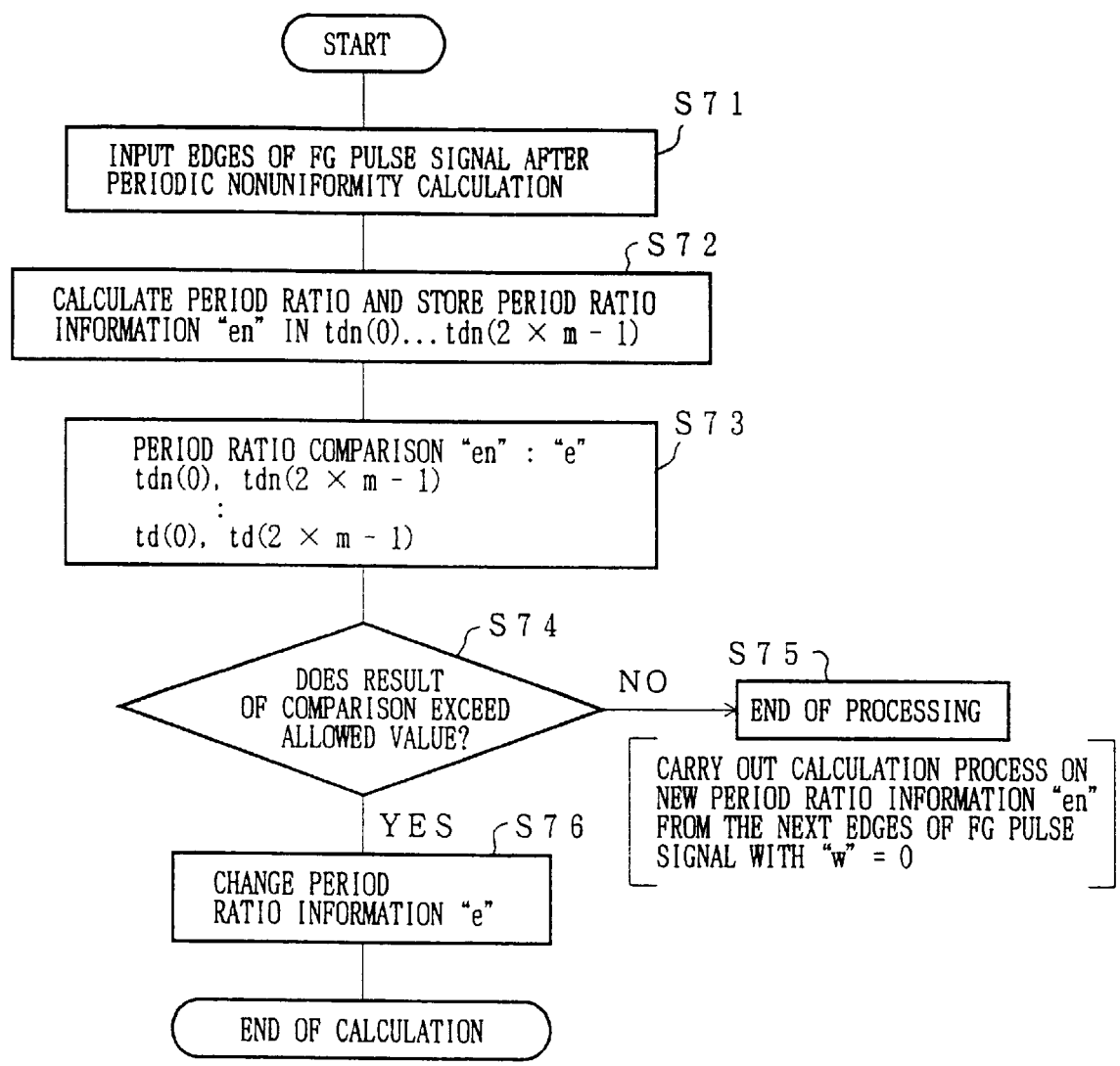
FIG. 16 is a flowchart of a motor speed control device in accordance with fourth embodiment of the present invention showing an operation of the FG nonuniformity correcting circuit which repeatedly calculates period ratio information so as to appropriately drive and control the motor in accordance with the result of the comparison of the period ratio information thus calculated.

The following will describe fourth embodiment of the present invention referring to FIG. 16. Note that, for convenience, members having the same functions as the members indicated in the first through third embodiment are given the same reference numerals, and the explanations thereof are omitted.

In the third embodiment, once the period ratio information "e" is calculated, the calculation thereof is not repeated so that (1) the FG nonuniformity correction is carried out one after another by the correction value determined from the first calculated period ratio information "e" or (2) the corrected information is read out.

In the present embodiment, the FG nonuniformity correction and a speed controlling calculation etc. are carried out in accordance with the input of the FG pulse signal "a", and a period ratio calculating process is repeatedly carried out continuously even after the period ratio is calculated.

The following will describe the operation of the FG nonuniformity correcting circuit 25 of the present embodiment referring to the flowchart of FIG. 16. Note that, in this flowchart, variables and memories are initialized prior to main processing. However, in FIG. 16, explanations thereof are omitted. Also, the FG nonuniformity correction and the speed controlling calculation etc., which are carried out in an actual operation, are not shown in FIG. 16.

First, when the edge of the FG pulse signal is inputted after the first FG nonuniformity correction and a speed controlling calculation are carried out (S71), the period ratio calculating process is carried out again one after another. Period ratio information "en" calculated in this process is stored as (tdn(0) . . . tdn(2×m−1)) separately from the period ratio information "e" (td(0) . . . td(2×m−1)) used for the current FG nonuiiformity correction (S72).

Thereafter, the period ratio information "e" (td(0) . . . td(2×m−1)) used for the current FG nonuniiformity correction and the newly calculated period ratio information "en" (tdn(0) . . . tdn(2×m−1)) are compared with respect to each other (S73). Then, it is judged whether the compared value exceeds a preset allowed value (S74). When it is judged in S74 that the compared value is within the allowed value, the main processing is finished, and after resetting to 0 the number of integrations "w", another calculation of period ratio information "en" is carried out from the next input of the edges of the FG pulse signal (S75).

On the other hand, when it is judged in S74 that the compared value exceeds the allowed value, it is judged that the correction of the periodic nonuniformity is not sufficient so that the period ratio information "e" is changed (S76).

Namely, in S74, it is judged whether the difference between the period ratio information "e" used for the current FG nonuniformity correction and the newly calculated period ratio information "en" is too large. For example, supposing that the allowed value of the difference is set to +1.1 or −0.9, when the difference is within ±10 percent, it is judged that the FG nonuniformity correction is sufficient.

Thus, in the case where the difference is too large, the changing process of the period ratio information "e" is carried out. In the changing process, for example, the period ratio information "e" (td(0) . . . td(2×m−1)) is increased or decreased by a predetermined amount. Although the amount by which the period ratio information "e" is increased or decreased is not limited, it is preferable that the period ratio information "e" is increased or decreased by the amount corresponding to the allowed value of the difference or 1/n (n≧2) of the allowed value of the difference.

For example, when the period ratio information "e" (td(0) and td(1)) are respectively 0.4 and 0.6, supposing that the allowed value of the difference is ±10 percent of td(0), the allowed range of td(0) is 0.36 to 0.44. Here, when the newly detected period ratio information "en" (td(0) and td(1)) are respectively 0.5 and 0.5, td(0) is out of the allowed range so that the changing process of the period ratio information "e" is carried out. Also, since the period ratio information "en" is shifted in the plus direction of the allowed range, td(0) of the period ratio information "e" is increased by 10 percent or by the amount of 0.04. Thus, the period ratio information "e" (td(0) and td(1)) after the changing process is 0.44 and 0.56, respectively.

The period ratio information "e" thus changed is then used to carry out the FG nonuniformity correction, thereby ensuring that the periodic nonuniformity is removed.

Namely, in the FG nonuniformity correcting circuit 25, the calculation of the period ratio information is carried out one after another even after the first FG nonuniformity correction is carried out, and the difference between the period ratio information "e" used for the preceding FG nonuniformity correction and the newly detected period ratio information "en" is compared with an allowed error. In the case where the difference between the period ratio information "e" and the period ratio information "en" exceeds the allowed error, the FG nonuniformity correction is carried out according to new period ratio information obtained by increasing or decreasing the period ratio information by a predetermined amount. On the other hand, in the case where the difference between the period ratio information "e" and the period ratio information "en" does not exceed the allowed error, the FG nonuniformity correction is carried out according to the period ratio information "e".

Note that, although the period ratio information "en" is usually compared with the period ratio information "e" used for the current FG nonuniformity correction, the present invention is not limited to this so that, alternatively, it is possible to compare the period ratio information "en" with a predetermined value.

Also, in the changing process, the method by which the period ratio information "e" is increased or decreased is effective in reducing the occurrence of a detection error etc. However, the method is not limited to the specified one. For example, it is possible to adopt a method by which the period ratio information "e" is replaced with newly calculated period ratio information "en".

Further, as a counter-measure process against the detection error, the changing process of S76 is carried out only when the difference in the comparison process of S74 exceeds the allowed value in succession for a several times. This permits to prevent the period ratio information "e" to be unnecessarily changed by period ratio information "en" suddenly detected due to the detection error, thereby ensuring that the FG nonuniformity correction is carried out.

As described, the motor speed control device of the present embodiment has an arrangement wherein the period ratio is calculated even after the FG nonuniformity correction is carried out, and a comparison is made between period ratio information "e" carrying out the current FG nonuniformity correction and newly calculated period ratio information "en", and in the case where the resulting value of the comparison exceeds a set value, a correction value carrying out the current FG nonuniformity correction, namely, the value of the period ratio is set again. Thus, the motor speed control device of the present embodiment is particularly effective, for example, in the case where period information is changed by a change in temperature etc. while the motor is running.

Figure 17:
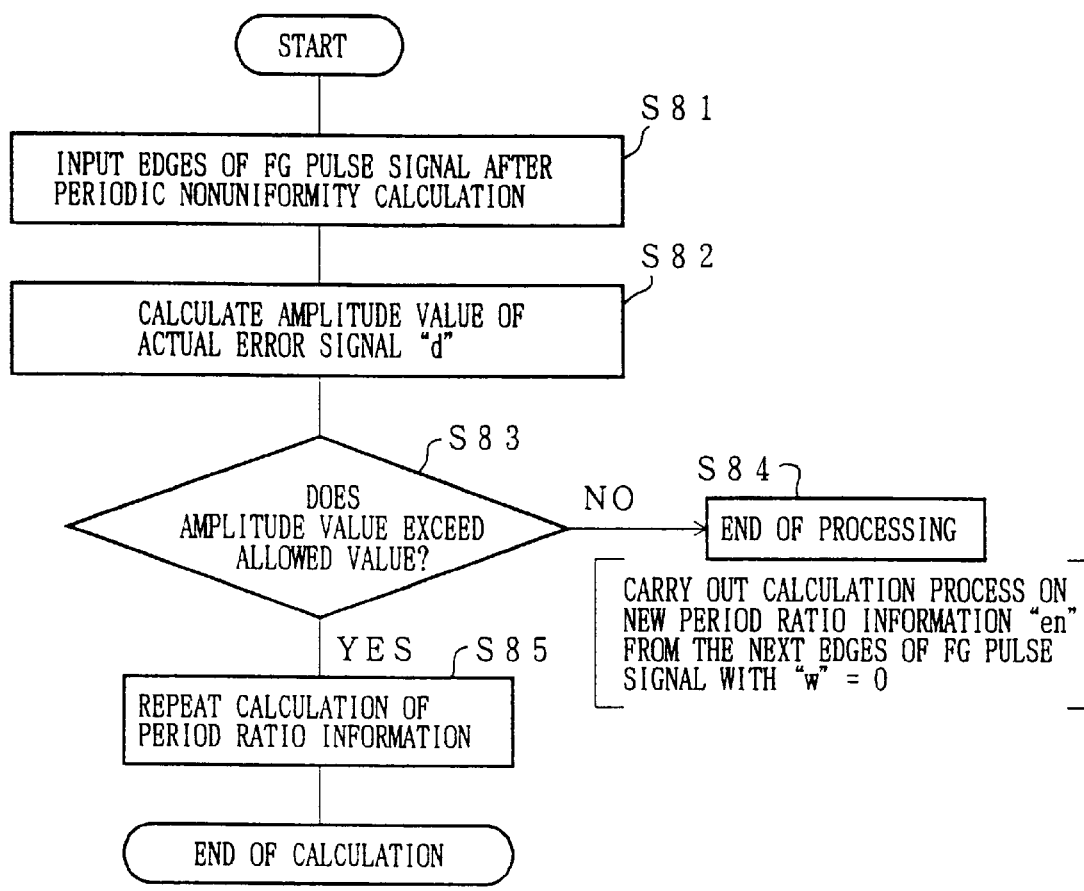
FIG. 17 is a flowchart of a motor speed control device in accordance with fifth embodiment of the present invention showing an operation of the FG nonuniformity correcting circuit which repeatedly calculates period ratio information so as to appropriately drive and control the motor in accordance with an amplitude value.
Figure 18:
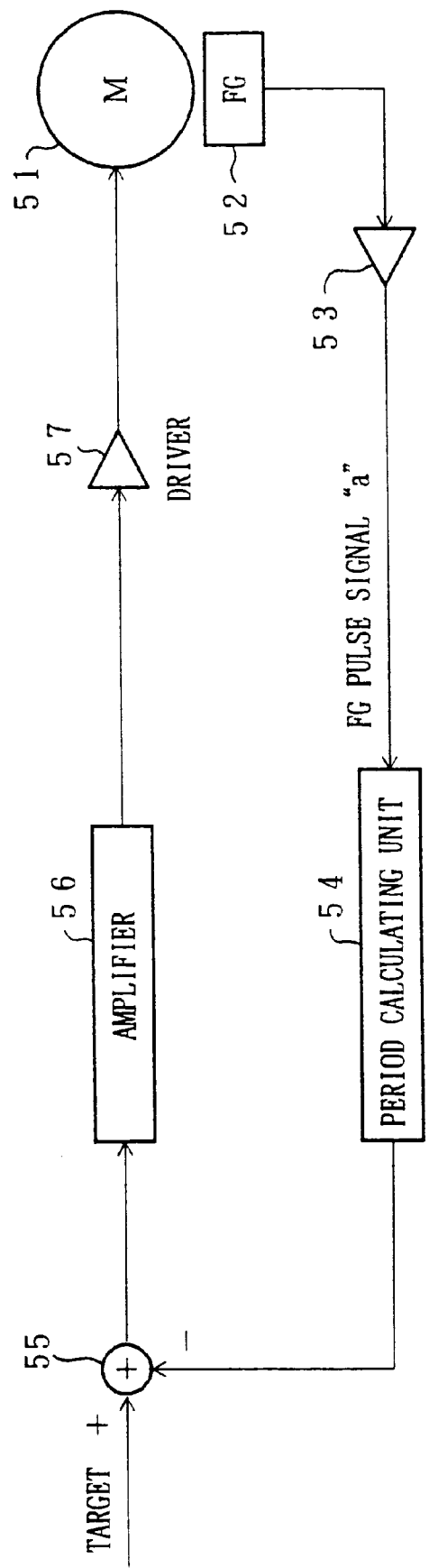
FIG. 18 is a block diagram showing a structure of a conventional motor speed control device.

The following will describe fifth embodiment of the present invention referring to FIG. 17. Note that, for convenience, members having the same functions as the members indicated in the first through fourth embodiment are given the same reference numerals, and the explanations thereof are omitted.

In the second or fourth embodiment, the FG nonuniformity correction and the speed controlling calculation etc. are carried out in response to the input of the first FG pulse signal "a", and the calculation process of the period ratio is repeatedly carried out one after another even after the period ratio is calculated, and the comparison of the period ratio information "e" and "en" is made.

However, in the present embodiment, instead of the comparison of the period ratio information "e" and "en", a process for determining the amplitude value of the actual error signal "d" is carried out after calculating the period ratio information "e", and a process for changing the period ratio information "e" is carried out in accordance with the amplitude value thus determined.

Namely, as shown in the flowchart of FIG. 17, first, when the edge of the FG pulse signal is inputted after the first FG nonuniformity correction and the speed controlling calculation etc. are carried out (S81), the amplitude value of the actual error signal d is calculated (S82). Specifically, for example, a method for detecting the maximum value and the minimum value of the actual error signal d in a predetermined duration can be conveniently adopted. However, in this method, it is possible that the detected value is different from the normal amplitude due to a noise or a sudden disturbance; thus, it is preferable, due to its accuracy, to adopt a method in which the degree of dispersion such as the standard deviation of the actual error signal "d" is determined.

Then, it is judged in S83 whether the amplitude value calculated in S82 is within the allowed value. As the allowed value, an amplitude value corresponding to a speed fluctuation under a normal condition (wow and flutter), having a predetermined margin is adopted.

If it is judged in S83 that the amplitude value is within the allowed value, the main processing is finished, and after resetting to 0 the number of integrations "w", another calculation of the amplitude value is carried out from the next input of the edges of the FG pulse signal (S84).

On the other hand, when it is judged in S83 that the amplitude value exceeds the allowed value, it is judged that the correction of the periodic nonuniformity is not sufficient so that the calculation process of the period ratio is carried out again (S85).

Namely, in the present embodiment, after the first FG nonuniformity correction is carried out, the amplitude value of the error signal "d" is calculated one after another, and the amplitude value thus calculated and the allowed value are compared with each other. In the case where the difference between the amplitude value is outside the allowed range, the FG nonuniformity correction is carried out in accordance with new period ratio information obtained by increasing or decreasing by a predetermined amount the period ratio information used for the preceding FG nonuniformity correction. On the other hand, in the case where the amplitude value does not exceed the allowed range, the FG nonuniformity correction is carried out in accordance with the period ratio information used for the preceding FG nonuniformity correction.

Note that, for a repeated calculation process of the period information in S85, it is possible to adopt a method indicated by the flowchart of FIG. 5, FIG. 6, FIG. 14, and FIG. 15. or a method in which the period ratio information "e" is increased or decreased. That is to say, the reason that the amplitude value far exceeding the wow and flutter is detected under a normal condition is because the periodic nonuniformity is superimposed on the actual error signal "d". Thus, in the case where an amplitude value exceeding the allowed value is detected, a process for changing the period ratio information "e" is carried out so as to carry out FG nonuniformity correction by more accurate period ratio information "e".

As described, in the motor speed control device of the present embodiment, the amplitude of the error signal is calculated after carrying out the FG nonuniformity correction, and in the case where the amplitude exceeds the set value, the correction value carrying out the FG nonuniformity correction, namely, the value of the period ratio is set again.

Thus, the motor speed control device of the present embodiment is particularly effective, for example, in the case where period information is changed by a change in temperature etc. while the motor is running.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A motor speed control device comprising:
    a rotation speed detecting circuit for obtaining N FG pulse signals, N≧1 where N is an integer, in one rotation of a motor; and
    a first controlling circuit for controlling a rotation speed of the motor in accordance with respective period information of (1) a rising edge-falling edge period and (2) a falling edge-rising edge period of the FG pulse signal;
    wherein said first controlling circuit includes a first FG nonuniformity correcting circuit for correcting, in accordance with the respective period information of the rising edge-falling edge period and the falling edge-rising edge period of the FG pulse signal, periodic nonuniformity of each said period, said first FG nonuniformity correcting circuit further including:
        a first period ratio calculating circuit for calculating respective period ratio information of the rising edge-falling edge period and the falling edge-rising edge period; and
        a first target correcting circuit for correcting a control target in accordance with a correction value that varies depending on the period ratio information,
        wherein said first period ratio calculating circuit calculates period ratio information from information which is an average of respective period information of the rising edge-falling edge period and the falling edge-rising edge period during i rotations of a motor, i≧where i is an integer.

2. The motor speed control device as set forth in claim 1, wherein said first FG nonuniformity correcting circuit includes:
    first period ratio calculating circuit for calculating, as a first period ratio, a ratio of the rising edge-falling edge period to the falling edge-rising edge period with respect to one pulse period;
    a first target correcting circuit for calculating respective target values of the rising edge-falling edge period and the falling edge-rising edge period in accordance with (1) a target value of a first pulse period and (2) the first period ratio; and a second error signal calculating circuit for calculating an error signal for use in controlling a rotation speed of a motor in accordance with a difference between (a) respective detected values of the rising edge-falling edge period and the falling edge-rising edge period and (b) the respective target values of the rising edge-falling edge period and the falling edge-rising edge period.

3. The motor speed control device as set forth in claim 1, wherein said first FG nonuniformity correcting circuit calculates one after another periodic nonuniformity even after a first FG nonuniformity correction is carried out so as to compare a correction value of periodic nonuniformity thus calculated with a set value, and in a case where a difference between the correction value and the set value exceeds a set error, said first FG nonuniformity correcting circuit carries out FG nonuniformity correction by a new correction value different from a correction value used for preceding FG nonuniformity correction.

4. The motor speed control device as set forth in claim 1, wherein said first FG nonuniformity correcting circuit detects one after another an amplitude value of an error signal which is a difference between a control target and the period information, and in a case where the detected value exceeds an allowed value, said first FG nonuniformity correcting circuit carries out FG nonuniformity correction by a new correction value different from a correction value used for preceding FG nonuniformity correction.

5. The motor speed control device as set forth in claim 1, further comprising:

a first period calculating circuit for calculating the rising edge-falling edge period and the falling edge-rising edge period of the FG pulse signal.

6. A motor speed control device comprising:

a rotation speed detecting circuit for obtaining N FG pulse signals, $N \geq 1$ where N is an integer, in one rotation of a motor; and a first controlling circuit for controlling a rotation speed of the motor in accordance with respective period information of (1) a rising edge-falling edge period and (2) a failing edge-rising edge period of the FG pulse signal;

wherein said first controlling circuit includes a first FG nonuniformity correcting circuit for correcting, in accordance with the respective period information of the rising edge-falling edge period and the falling edge-rising edge period of the FG pulse signal, periodic nonuniformity of each said period, said first FG nonuniformity correcting circuit further including:

a first period ratio calculating circuit for calculating respective period ratio information of the rising edge-falling edge period and the falling edge-rising edge period; and a first period correcting circuit for normalizing each of the period information in accordance with a correction value that varies depending on the period ratio information, wherein said first period ratio calculating circuit calculates period ratio information from information which is an average of respective period information of the rising edge-falling edge period and the falling edge-rising edge period during i rotations of a motor.

7. The motor speed control device as set forth in claim 6, wherein said first FG nonuniformity correcting circuit calculates one after another periodic nonuniformity even after a first FG nonuniformity correction is carried out so as to compare a correction value of periodic nonuniformity thus calculated with a set value, and in a case where a difference between the correction value and the set value exceeds a set error, said first FG nonuniformity correcting circuit carries out FG nonuniformity correction by a new correction value different from a correction value used for preceding FG nonuniformity correction.

8. The motor speed control device as set forth in claim 6, wherein said first FG nonuniformity correcting circuit detects one after another an amplitude value of an error signal which is a difference between a control target and the period information, and in a case where the detected value exceeds an allowed value, said first FG nonuniformity correcting circuit carries out FG nonuniformity correction by a new correction value different from a correction value used for preceding FG nonuniformity correction.

9. The motor speed control device as set forth in claim 6, wherein said first FG nonuniformity correcting circuit includes:

a first period ratio calculating circuit for calculating, as a first period ratio, a ratio of the rising edge-falling edge period to the falling edge-rising edge period with respect to one pulse period;

a first period correcting circuit for converting respective detected values of the rising edge-falling edge period and the falling edge-rising edge period into a value representing one pulse period in accordance with the first period ratio; and a first error signal calculating circuit for calculating an error signal, for use in controlling a rotation speed of the motor, in accordance with a difference between (1) the respective detected values of the rising edge-falling edge period and the falling edge-rising edge period and (2) a target value of the pulse period.

10. The motor speed control device as set forth in claim 6, further comprising including a first period calculating circuit for calculating the rising edge-falling edge period and the falling edge-rising edge period of the FG pulse signal.

11. A motor speed control device comprising:

a rotation speed detecting circuit, provided in m quantities, $m \geq 2$ where m is an integer, for obtaining N PG pulse signals, $N \geq 1$ where N is an integer, in one rotation of a motor;

a controlling circuit for controlling a rotation speed of the motor in accordance with respective period information of (1) a rising edge-falling edge period and (2) a falling edge-rising edge period of N FG pulse signals;

wherein said controlling circuit includes a FG nonuniformity correcting circuit f or correcting, in accordance with period information between adjacent edges of the rising edge and/or the falling edge of each the PG pulse signal, periodic nonuniformity of each period between the edges, said FG nonuniformity correcting circuit further including:

a period ratio calculating circuit for calculating respective period ratio information of the rising edge-falling edge period and the falling edge-rising edge period, and a target correcting circuit for correcting a control target by a correction value in accordance with the period ratio information, wherein said period ratio calculating circuit calculates period ratio information from information which is an average of respective period information of the rising edge-falling edge period and the falling edge-rising edge period during i rotations of a motor, i≧1 where i is an integer.

12. The motor speed control device as set forth in claim 11, wherein said second FG nonuniformity correcting circuit calculates one after another periodic nonuniformity even after a first FG nonuniformity correction is carried out so as to compare a correction value of periodic nonuniformity thus calculated with a set value, and in a case where a difference between the correction value and the set value exceeds a set error, said second FG nonuniformity correcting circuit carries out FG nonuniformity correction by a new correction value different from a correction value used for preceding FG nonuniformity correction.

13. The motor speed control device as set forth in claim 11, wherein said second FG nonuniformity correcting circuit detects one after another an amplitude value of an error signal which is a difference between a control target and the period information, and in a case where the detected value exceeds an allowed value, said second FG nonuniformity correcting circuit carries out FG nonuniformity correction by a new correction value different from a correction value used for preceding FG nonuniformity correction.

14. The motor speed control device as set forth in claim 13, wherein said second FG nonuniformity correcting circuit includes:

a second period ratio calculating circuit for calculating, as a second period ratio, a ratio of the rising edge-falling edge period to the falling edge-rising edge period with respect to one pulse period;

a second target correcting means for calculating respective target values of the rising edge-falling edge period and the falling edge-rising edge period in accordance with (1) a target value of a second pulse period and (2) the second period ratio; and a fourth error signal calculating circuit for calculating an error signal, for use in controlling a rotation speed of a motor, in accordance with a difference between (a) respective detected values of the rising edge-falling edge period and the falling edge-rising edge period and (b) the respective target values of the rising edge-falling edge period and the falling edge-rising edge period.

15. The motor speed control device as set forth in claim 11, further comprising a second period calculating circuit for calculating a period between adjacent edges of the rising edge and/or the falling edge of each FG pulse signal.

16. The motor speed control device as set forth in claim 11, wherein each of said m quantities of rotation speed detecting circuit finds FG pulse signals whose phases shift to each other by (180/m)°.

17. A motor speed control device comprising:

a rotation speed detecting circuit, provided in m quantities, m≧2 where m is an integer, for obtaining N FG pulse signals, N≧1 where N is an integer, in one rotation of a motor; and a controlling circuit for controlling a rotation speed of the motor in accordance with respective period information of (1) a rising edge-falling edge period and (2) a falling edge-rising edge period of N FG pulse signals;

wherein said controlling circuit includes a FG nonuniformity correcting circuit for correcting, in accordance with period information between adjacent edges of the rising edge and/or the falling edge of each the FG pulse signal, periodic nonuniformity of each period between the edges, wherein said FG nonuniformity correcting circuit further includes:

a period ratio calculating circuit for calculating respective period ratio information of the rising edge-falling edge period and the falling edge-rising edge period; and a period correcting circuit for normalizing each of the period information in accordance with a correction value that varies depending on the period ratio information, wherein said period ratio calculating circuit calculates period ratio information from information which is an average of respective period information of the rising edge-falling edge period and the falling edge-rising edge period during i rotations of a motor, i≧1 where i is an integer.

18. The motor speed control device as set forth in claim 17, wherein said FG nonuniformity correcting circuit calculates one after another periodic nonuniformity even after a first FG nonuniformity correction is carried out so as to compare a correction value of periodic nonuniformity thus calculated with a set value, and in a case where a difference between the correction value and the set value exceeds a set error, said FG nonuniformity correcting circuit carries out FG nonuniformity correction by a new correction value different from a correction value used for preceding FG nonuniformity correction.

19. The motor speed control device as set forth in claim 17, wherein said FG nonuniformity correcting circuit detects one after another an amplitude value of an error signal which is a difference between a control target and the period information, and in a case where the detected value exceeds an allowed value, said FG nonuniformity correcting circuit carries out FG nonuniformity correction by a new correction value different from a correction value used for preceding FG nonuniformity correction.

20. The motor speed control device as set forth in claim 17, wherein said FG nonuniformity correcting circuit includes:

a period ratio calculating circuit for calculating, as a period ratio, a ratio of the rising edge-falling edge period to the falling edge-rising edge period with respect to one pulse period;

a period correcting circuit for converting respective detected values of the rising edge-falling edge period and the falling edge-rising edge period into a value representing one pulse period in accordance with the second period ratio; and an error signal calculating circuit for calculating an error signal, for use in controlling a rotation speed of the motor, in accordance with a difference between (1) the respective detected values of the rising edge-falling edge period and the falling edge-rising edge period and (2) a target value of the pulse period.

21. The motor speed control device as set forth in claim 17, further including a period calculating circuit for calculating a period between adjacent edges of the rising edge and/or the falling edge of each FG pulse signal.

22. The motor speed control device as set forth in claim 17, wherein each of said rotation speed detecting circuits finds FG pulse signals whose phases shift to each other by (180/m)°.

* * * * *